(12) United States Patent
Matsumoto et al.

(10) Patent No.: US 9,285,054 B2
(45) Date of Patent: Mar. 15, 2016

(54) CONTROL VALVE

(71) Applicants: Michio Matsumoto, Tokyo (JP); Isao Sendo, Tokyo (JP); Masaaki Tonegawa, Tokyo (JP)

(72) Inventors: Michio Matsumoto, Tokyo (JP); Isao Sendo, Tokyo (JP); Masaaki Tonegawa, Tokyo (JP)

(73) Assignee: TGK CO., LTD., Tokyo (JP)

( * ) Notice: Subject to any disclaimer, the term of this patent is extended or adjusted under 35 U.S.C. 154(b) by 382 days.

(21) Appl. No.: 13/631,711

(22) Filed: Sep. 28, 2012

(65) Prior Publication Data

US 2013/0082199 A1 Apr. 4, 2013

(30) Foreign Application Priority Data

Sep. 30, 2011 (JP) .................................. 2011-217463
Dec. 15, 2011 (JP) .................................. 2011-274883
May 25, 2012 (JP) .................................. 2012-120151

(51) Int. Cl.
*F16K 31/06* (2006.01)
*F16K 31/40* (2006.01)
*F16K 39/02* (2006.01)

(52) U.S. Cl.
CPC ........... *F16K 31/408* (2013.01); *F16K 31/0655* (2013.01); *F16K 39/022* (2013.01); *F16K 39/024* (2013.01)

(58) Field of Classification Search
CPC . F16K 31/122; F16K 31/124; F16K 31/0655; F16K 31/0693
USPC ............... 251/30.01, 129.07, 129.08, 129.15, 251/282, 50–52, 55
See application file for complete search history.

(56) References Cited

U.S. PATENT DOCUMENTS 2,543,010 A * 2/1951 Gardner .................... 251/129.07
3,428,090 A   2/1969 Hose et al. ................ 137/630.14

(Continued)

FOREIGN PATENT DOCUMENTS

CN   1104020 A   6/1995   .............. F16K 17/30
EP   1693 523 A2  8/2006   ................ E03C 1/05

(Continued)

OTHER PUBLICATIONS

CN201210364181.7, Notification of the First Office Action, dated Jul. 3, 2015, Applicant: TGK Co., Ltd.

(Continued)

*Primary Examiner* — Matthew W Jellett
(74) *Attorney, Agent, or Firm* — Martine Penilla Group, LLP

(57) ABSTRACT

A control valve according to an embodiment includes a guide member of a cylindrical shape extending coaxially with a valve hole, a valve element of a bottomed cylindrical shape for opening and closing a valve section such that the valve element touches and leaves the valve hole, and a pressure-canceling structure for canceling out at least part of pressure acting on the valve element by introducing a working fluid into a back pressure chamber via a leak passage, the pressure-canceling structure including the back pressure chamber, surrounded by the valve element and the guide member, and the leak passage communicating between the valve hole and the back pressure chamber. A sliding portion and a spacing are formed in an overlapped portion which is a region overlapped by the valve element and the guide member. The sliding portion is connected circumferentially at least when the valve section is closed, and the proportion of the spacing occupied in the overlapped portion is larger than the proportion of the sliding portion occupied at the time when the valve section is open.

4 Claims, 30 Drawing Sheets

(56) References Cited

U.S. PATENT DOCUMENTS

| | | | |
|---|---|---|---|
| 3,471,119 A * | 10/1969 | Risk | 251/84 |
| 4,523,436 A * | 6/1985 | Schedel et al. | 62/222 |
| 4,832,312 A * | 5/1989 | Linder et al. | 251/129.07 |
| 5,010,923 A * | 4/1991 | Kouda et al. | 137/625.34 |
| 5,159,951 A * | 11/1992 | Ono et al. | 137/486 |
| 5,217,043 A * | 6/1993 | Novakovic | 137/460 |
| 5,996,369 A * | 12/1999 | Hirota | 62/324.6 |
| 6,505,812 B1 * | 1/2003 | Anastas | 251/129.07 |
| 7,757,873 B2 * | 7/2010 | Thiery et al. | 215/282 |
| 7,857,282 B2 * | 12/2010 | Goossens | 251/129.07 |
| 8,272,399 B2 * | 9/2012 | Farrow et al. | 137/601.02 |
| 8,308,130 B2 * | 11/2012 | Vaz De Azevedo | 251/129.07 |
| 8,328,157 B2 * | 12/2012 | Schulz et al. | 251/129.15 |
| 8,839,767 B2 * | 9/2014 | Keller | 123/520 |
| 2009/0183510 A1 * | 7/2009 | Bielass | 60/611 |
| 2013/0313461 A1 * | 11/2013 | Tonegawa | 251/318 |

FOREIGN PATENT DOCUMENTS

| | | | |
|---|---|---|---|
| JP | 7-208631 | 8/1995 | F16K 31/06 |
| JP | 11-287354 | 10/1999 | F16K 31/122 |
| WO | WO02/40907 A1 | 5/2002 | F16K 31/06 |

OTHER PUBLICATIONS

JP2012-120151, Notice of Reason(s) for Refusal, Dispatch Date: Jun. 2, 2015, Dispatch No. 249318, Ref. No. TGK12-111.

* cited by examiner (A)

(B)

(A)

(B)

(A)

(B)

(A)

(B)

(A)

(B)

(A)

(B)

(A)

(B)

(A)

(B)

(C)

CONTROL VALVE

CLAIM OF PRIORITY TO RELATED APPLICATION

The present application is claiming priority of Japanese Patent Application No. 2011-217463, filed on Sep. 30, 2011; Japanese Patent Application No. 2011-274883, filed on Dec. 15, 2011; and Japanese Patent Application No. 2012-120151, filed on May 25, 2012, the contents of which are incorporated herein by reference.

BACKGROUND OF THE INVENTION

1. Field of the Invention

The present invention relates to a control valve for controlling the flow of working fluid and, more particularly to a control valve provided with an actuator that electrically adjusts the valve opening degree.

2. Description of the Related Art

An automotive air conditioner is generally configured such that it includes a compressor, a condenser, an evaporator, and so forth arranged in a refrigerant circulation passage. Various types of control valves are provided (see Reference (1) in the following Related Art List, for instance). Here, these various types of control valves are used to switch the refrigerant circulation passages according to the operation state in such a refrigeration cycle and regulate the flow rate of refrigerant. A mechanical valve, which opens and closes a valve section through a balance between the force exerted by a pressure received from the refrigerant and the biasing force of a spring opposing the force exerted thereby, and an electrically driven valve, provided with an actuator for electrically regulating the opening degree of the valve section from the outside, are used, as appropriate, as the control valves used herein.

RELATED ART LIST (1) Japanese Unexamined Patent Application Publication (Kokai) No. Hei11-287354.

Where the electrically driven valve is used for such an air conditioner, a motor, a solenoid or the like is used as the actuator but it is desired that the actuator be of a reduced size for the purpose of achieving the space saving and energy saving, for instance. In this respect, the electrically driven valve, having a large-diameter value section, which particularly requires a relatively large open/close drive force may be provided with a back pressure canceling structure whereby a fluid pressure acting on the valve element can be canceled out. In order to maintain the back pressure in such an electrically drive valve, the clearance of a sliding portion in the valve element that divides the back pressure chamber is frequently set to a minimum size.

In such an air conditioner, there are cases where the discharged refrigerant contains foreign material, such as metallic powders, as a result of frictional wear and the like of the sliding portion. The foreign material may flow into the sliding portion in a process where the refrigerant circulates in a refrigeration cycle and may hinder the smooth sliding operation. In other words, pressure differences between an upstream side and a downstream side of a valve section occur in the valve element of the electrically driven valve. Thus, a pressure difference also occurs in between an inlet port and an outlet port of the sliding portion of the valve element, and the foreign material flows into the sliding portion through this pressure difference. As a result of accumulation of the foreign material in the sliding portion, the foreign material may adhere to the valve element, for instance. This may possibly interfere with the smooth opening and closing of the valve element. The same problem may occur not only in vehicles but also in apparatuses provided with the electrically drive valves.

SUMMARY OF THE INVENTION

A purpose of the present invention is, therefore, to provide an electrically-driven valve capable of preventing or inhibiting the malfunction of valve section caused by the entry of foreign material contained in the working fluid into the spacing between a guide member and a valve element, for instance.

In order to resolve the aforementioned problems, a control valve according to one embodiment of the present invention includes: a body having a lead-in port and a lead-out port of working fluid; a valve hole provided in a passage joining the lead-in port to the lead-out port; a guide member of a cylindrical shape, provided inside the body, configured to extend coaxially with the valve hole; a valve element of a bottomed cylindrical shape configured to open and close a valve section such that the valve element is inserted into or around the guide member in a slidable manner relative thereto and such that a base of the valve element touches and leaves the valve hole by displacing the valve element in a direction of axis; an actuator configured to supply a drive force in the direction of axis line to the valve element; and a pressure-canceling structure configured to cancel out at least part of pressure acting on the valve element by introducing a working fluid introduced into a back pressure chamber via a leak passage, the pressure-canceling structure including the back pressure chamber, surrounded by the valve element and the guide member, and the leak passage communicating between the valve hole and the back pressure chamber. A sliding portion and a spacing are formed in an overlapped portion which is a region overlapped by inserting the valve element into or around the guide member, and the sliding portion and the spacing are structured such that the sliding portion is connected circumferentially at least when the valve section is closed, and the cross section of clearance of the sliding portion is smaller than the cross section of the leak passage, and such that a proportion of the spacing occupied in the overlapped portion is larger than a proportion of the sliding portion occupied therein at the time when the valve section is open.

By employing this embodiment, at least when the valve section is closed, the sliding portion is connected circumferentially in the overlapped portion where the valve element and the guide member overlap with each other, and the cross section of clearance of the sliding portion is smaller than the cross section of the leak passage. Accordingly, the canceling structure can function effectively while the pressure of the working fluid introduced into the back pressure chamber is stably maintained. Thus, a relatively large valve section can be driven with a small drive force. Should foreign material is introduced into the sliding portion under this condition, the foreign material can be discharged out of the sliding portion through the spacing. This is because the proportion of the spacing occupied in the overlapped portion is larger than the proportion of the sliding portion occupied therein at the time when the valve section is open. That is, the malfunction of the valve section caused by the entry of foreign material contained in the working fluid thereinto can be prevented or inhibited.

Another embodiment of the present invention relates also to a control valve. The control valve includes: a body having a lead-in port and a lead-out port of working fluid; a valve hole provided in a passage joining the lead-in port to the lead-out port; a partition provided inside the body; a valve element configured to open and close a valve section such that the valve element is inserted into or around the partition in a displaceable manner relative thereto and such that the valve element touches and leaves the valve hole by displacing the valve element in a direction of axis; an actuator configured to supply a drive force in the direction of axis line to the valve element; and a pressure-canceling structure configured to cancel out at least part of pressure acting on the valve element by introducing a working fluid introduced into a back pressure chamber via a leak passage, the pressure-canceling structure including the back pressure chamber, surrounded by the valve element and the guide member, and the leak passage communicating between the valve hole and the back pressure chamber. The clearance of an overlapped portion at the time when the valve section is fully open is larger than that at the time when the valve section is closed, the overlapped portion being a region overlapped by the partition and the valve element.

By employing this embodiment, the clearance between the valve element and the partition gets larger when the valve section is fully open and therefore foreign material is more likely to be discharged should the foreign material be present in the overlapped portion. That is, the malfunction of the valve section caused by the presence of foreign material contained in the working fluid can be prevented or inhibited.

Still another embodiment of the present invention relates to a control valve. The control valve includes: a body having a lead-in port and a lead-out port of working fluid; a valve hole provided in a passage joining the lead-in port to the lead-out port; a partition provided inside the body; and a valve element configured to form a back pressure chamber, disposed counter to the valve hole, between the partition and the valve element and configured to open and close a valve section by displacing the valve element in a direction of axis line such that the valve element touches and leaves the valve hole. The clearance of an overlapped portion at the time when the valve section is fully open is larger than that at the time when the valve section is closed, the overlapped portion being a region overlapped by the partition and the valve element.

By employing this embodiment, the clearance between the valve element and the partition gets larger when the valve section is fully open and therefore foreign material is more likely to be discharged should the foreign material be present in the overlapped portion. That is, the malfunction of the valve section caused by the presence of foreign material contained in the working fluid can be prevented or inhibited.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIGS. 19A and 15B are each a partially enlarged sectional view showing structure and operation of components surrounding a valve element.

DETAILED DESCRIPTION OF THE INVENTION

Figure 1:
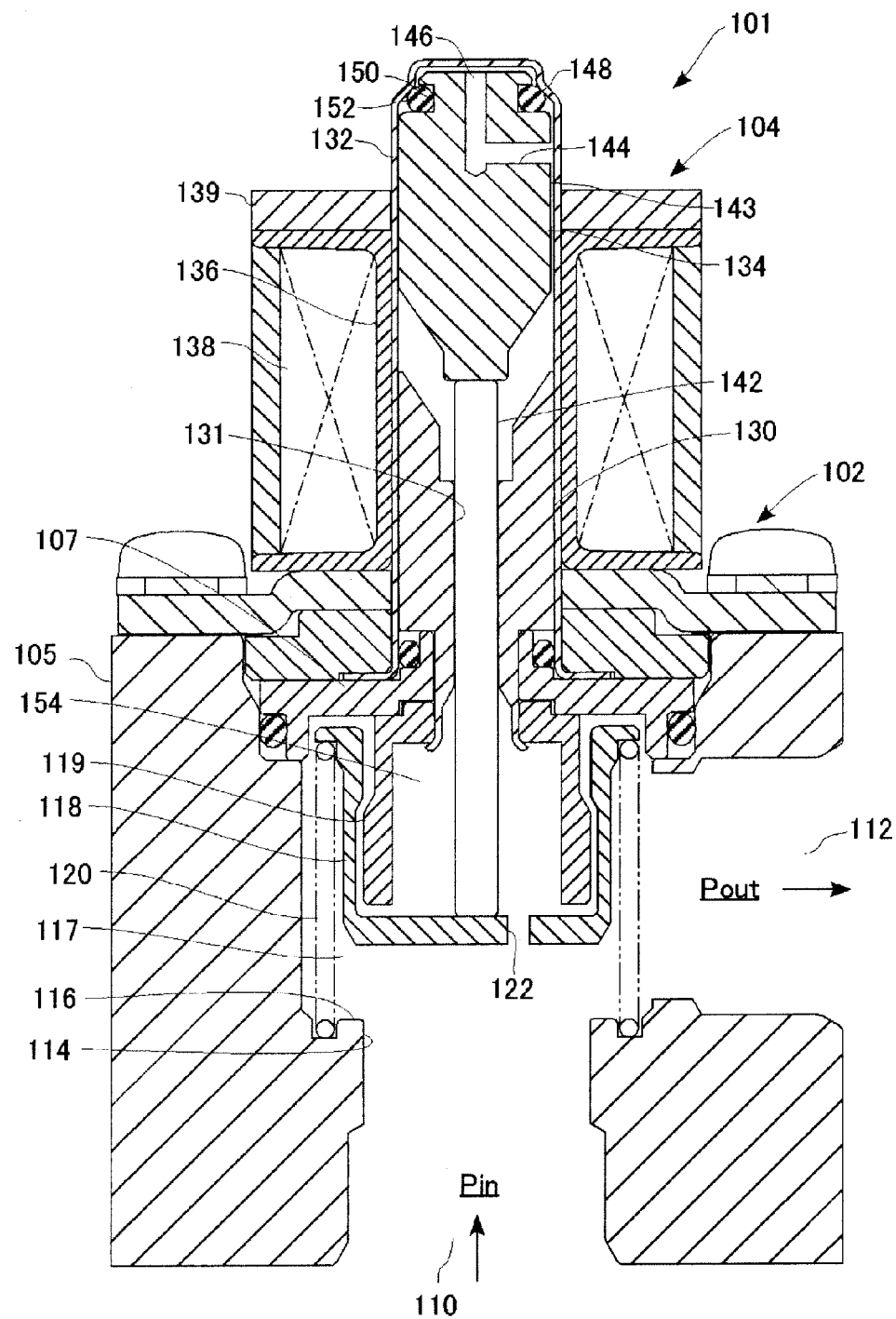
FIG. 1 is a cross-sectional view showing a concrete structure and operation of a control valve according to a first embodiment of the present invention.

The invention will now be described based on preferred embodiments which do not intend to limit the scope of the present invention but exemplify the invention. All of the features and the combinations thereof described in the embodiment are not necessarily essential to the invention.

The present invention will now be described in detail based on preferred embodiments with reference to the accompanying drawings.

First Embodiment

The present embodiment is a constructive reduction to practice of the present invention where a control valve according to the preferred embodiments is used as an electromagnetic valve applied to an air conditioner of an electric-powered vehicle. The automotive air conditioner is provided with a refrigeration cycle wherein a compressor, an indoor condenser, an outdoor heat exchanger, an evaporator, and an accumulator are connected to each other by piping. The automotive air conditioner is configured as a heat pump type air conditioner. This heat pump type air conditioner performs air conditioning such that it utilizes the heat generated by a refrigerant in a process where the refrigerant as a working fluid circulates with its refrigeration cycle varied.

The automotive air conditioner operates in such a manner as to switch a plurality of refrigerant circulation passages at the time of cooling and heating. In the refrigeration cycle, the indoor condenser and the outdoor heat exchanger are so configured as to be operable as a condenser in parallel with each other, and the evaporator and the outdoor heat exchanger are so configured as to be operable as an evaporator in parallel with each other. The compressor is configured as a motor compressor that houses a motor and a compressor within a housing. The indoor condenser, which is provided inside a passenger compartment, functions as an auxiliary condenser that radiates heat off the refrigerant separately from the outdoor heat exchanger. The outdoor heat exchanger, which is installed outside the passenger compartment, functions as an outdoor condenser that radiates heat off the refrigerant passing through the inside during a cooling operation. On the other hand, the outdoor heat exchanger functions as an outdoor evaporator that evaporates the refrigerant passing through the inside during a heating operation. The evaporation, which is installed inside the passenger compartment, functions as an indoor evaporator that evaporates the refrigerant passing through the inside. The accumulator is an apparatus where a refrigerant sent out from the evaporator is stored while gas refrigerant and liquid refrigerant are separated from each other, and the accumulator, which has a liquid phase unit and a gas phase unit, supplies the refrigerant in the gas phase unit to the compressor.

The control valve according to the present embodiment, which is provided downstream of the evaporator, functions as an evaporation pressure control valve that controls the evaporation pressure of the refrigerant in the evaporator. That is, the control valves according to the present embodiment are provided downstream of the indoor evaporator and the outdoor evaporator, respectively. And each control valve regulates the opening degree of a downstream-side passage of the evaporator by regulating the opening degree of a valve section through current supply and thereby regulates the evaporation pressure of the evaporator. In the present embodiment, an open/close valve (on/off valve) that opens and closes according as it is electrically conducted or not is used as the control valve, and the opening degree is adjusted by adjusted the valve-opening time per given time period. In a modification of the present embodiment, the control valve may be configured as a proportional valve capable of directly regulating the valve-opening area of the valve section or a differential pressure regulating valve.

Figure 2:
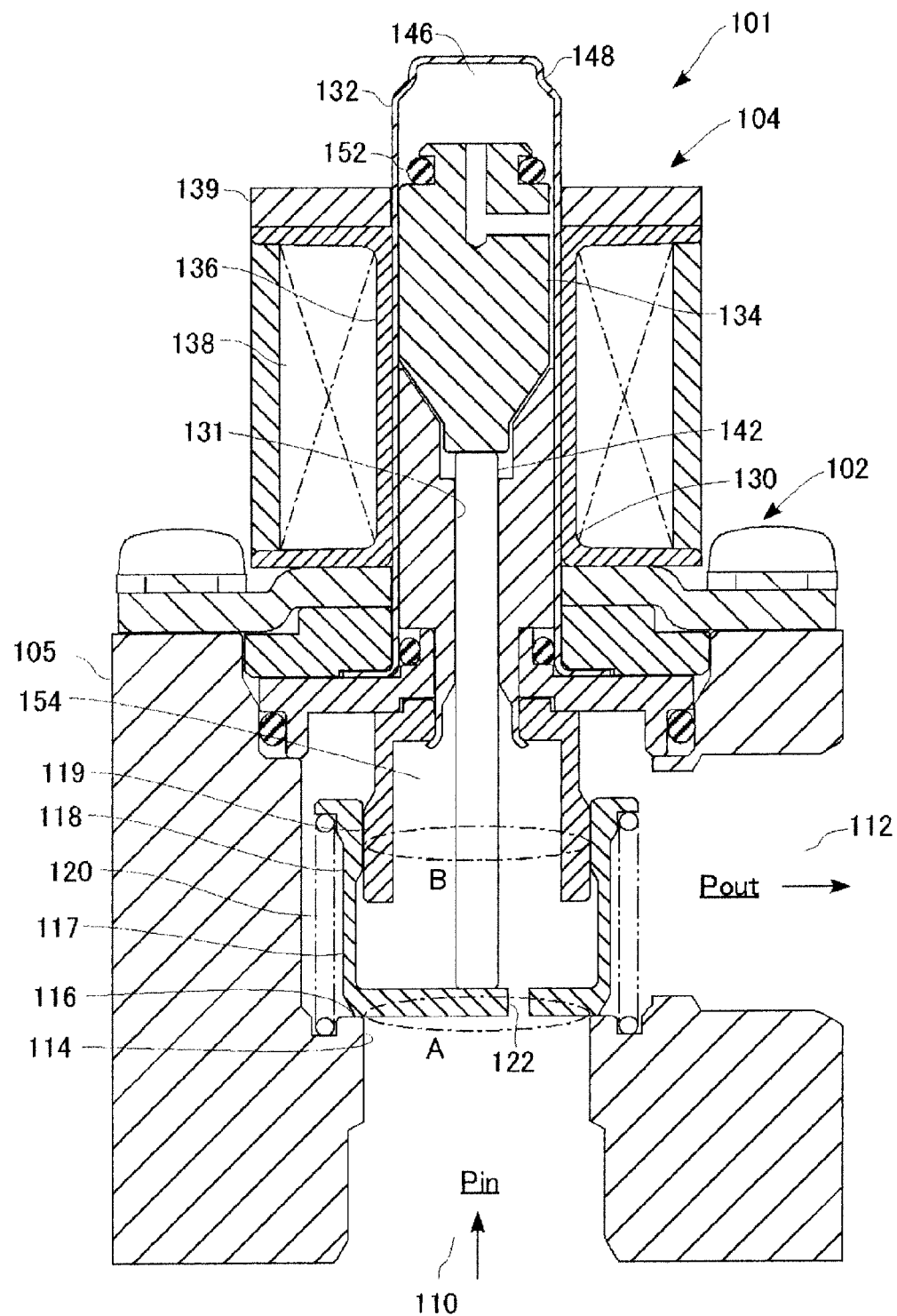
FIG. 2 is a cross-sectional view showing a concrete structure and operation of a control valve according to a first embodiment of the present invention.

A description is now given of a concrete structure of the control valve according to the present embodiment. FIG. 1 and FIG. 2 are each a cross-sectional view showing the concrete structure and operations of a control valve according to a first embodiment of the present invention.

As shown in FIG. 1, a control valve 101 is constituted by integrally assembling a valve unit 102 and a solenoid 104. Here, the valve unit 102 houses a valve mechanism, and the solenoid 104 drives the valve mechanism. The solenoid 104 is mounted to an end (top end) of a body 105 in the valve unit 102. A lead-in port 110 leading to an upstream passage is provided at the other end (lower end) of the body 105, whereas a lead-out port 112 leading to a downstream passage is provided in a side wall of the body 105. A valve hole 114 is provided in an internal passage joining the lead-in port 110 to the lead-out port 112, and a valve seat 116 is formed in an opening end located downstream of the valve hole.

A bottomed valve element 118 of a cylindrical shape is disposed in a pressure chamber 117 located downstream of the valve hole 114. A guide member 119 of a cylindrical shape extends downward from the top end of the body 105 toward the pressure chamber 117, and the valve element 118 is inserted around (outserted to) the guide member 119 in a slidable manner relative to the guide member 119. In other words, in this example as illustrated in FIG. 1, the valve element 118 is inserted (outserted) to the guide member 119 with the guide member 119 being located inside the valve element 118 in a slidable manner relative to the guide member 119. The valve element 118 and the guide member 119 are disposed coaxially with the valve hole 114 (i.e., extend along the same axis line). The valve element 118 is guided by the guide member 119 and stably supported thereby. Set between the valve element 118 and the body 105 is a spring 120 that biases the valve element 118 in a valve opening direction.

The solenoid 104 is so mounted as to close an upper end opening of the body 105. The solenoid 104 includes a core 130 jointed to a connection member 107 that closes the opening of the body 105, a sleeve 132, which is a bottomed cylinder fixed to the connection member 107 in such a manner as to house the core 130 therein, a plunger 134 disposed within the sleeve 132 in a position axially opposite to the core 130 in the direction of axis line, a bobbin 136 inserted around (outserted to) the sleeve 132 and fitted thereto, and an electromagnetic coil 138 wound around the bobbin 136. The plunger 134 is disposed opposite to the valve element 102 relative to the core 130, namely, disposed at the bottom part of the sleeve 132. A resin mold is so applied to the electromagnetic coil 138 as to cover it from outside. A circular plate 139 formed of a magnetic material is provided on top of the bobbin 136. The circular plate 139 functions as a yoke that constitutes a magnetic circuit when power is being applied.

In the core 130, a through-hole 131 is provided along the axis line of the core 130, so that an elongated actuating rod 142 penetrates the through-hole 131. The actuating rod 142 is such that an upper end of the actuating rod 142 abuts against a lower surface of the plunger 134 and such that a lower end of the actuating rod 142 abuts against a base of the valve element 118. That is, the actuating rod 142 is so disposed as to be interposed between the plunger 134 and the valve element 118 without being fixed thereto, so that the actuating rod 142 operates integrally with the plunger 134 and the valve element 118. A back pressure chamber 146 is formed between a base of the sleeve 132 and the plunger 134. The plunger 134 is of a stepped cylindrical shape. And a communicating groove 143 in parallel with the axis line is provided in a predetermined position of an outer circumferential surface of the plunger 134. Further, a communicating path 144 that communicates between the communicating groove 143 and the back pressure chamber 146 is provided in an upper half of the plunger 134. By employing such a structure as described above, a state of communication between a space, between the core 130 and the plunger 134, and the back pressure chamber 146 is maintained.

The inside diameter of an upper end part of the sleeve 132 is reduced and a stepped portion formed in this upper end part of the sleeve 132 with the reduced inside diameter is comprised of a stopper 148. The stopper 148 restricts the displacement of the plunger 134 in the upward direction along the direction of axis line. Also, the outside diameter of the upper end part of the plunger 134 is reduced, and a recessed fitting-groove 150 is formed on a periphery in the upper end part of the plunger 134 with the reduced outside diameter. An O-ring 152, which functions as a "circular shock-absorbing member", is fitted on the fitting groove 150. While no power is being supplied to the solenoid 104 (i.e., while the solenoid 104 is being turned off), a sound absorbing mechanism is structured by the O-ring 152 and the stopper 148.

That is, as the conduction state (on/off state) of the solenoid 104 is switched from the conducting state to the nonconducting state (from on to off), the plunger 134 is displaced in the upward direction along the direction of axis line. However, the displacement of the plunger 134 is restricted in a manner such that the stopper 148 stops the O-ring 152 in an engaged manner. The O-ring 152, which functions as the shock-absorbing member, deforms when the O-ring 152 is stopped by the stopper 148, thereby absorbing the shock. As a result, the occurrence of hitting sound is suppressed as compared with the case when the plunger 134 is directly stopped by the stopper 148.

The diameter of the upper end part of the sleeve 132 is reduced and the upper end part thereof is configured in such a manner as to abut against the O-ring 152 on a tapered surface of the upper end part thereof. Thus, when the O-ring 152 is stopped by the stopper 148, an obliquely-downward normal force acts on the O-ring 152 as a reaction force from the stopper 148. In other words, the O-ring 152 receives, as the reaction force, not only a component of force in the direction of axis line of the plunger 134 but also a component of force in a direction perpendicular to the direction of axis line. Besides, the component of force in the direction perpendicular thereto acts radially inward, so that the O-ring 152 can be released or moved to the inward side and therefore the displacement, if any, toward the direction of axis line can be prevented or suppressed. By employing such a structure as described above, the permanent deformation of the O-ring 152 can be prevented even though the compressive stress repeatedly acts on the O-ring 152. Hence, the sound absorbing function can be maintained stably over a long period of time.

The fitting groove 150 is formed in the plunger 134 such that when power is being applied to the solenoid 104, the fitting groove 150 is located above the circular plate 139 in a state where the plunger 34 is closest to the core 130 (see FIG. 2). As a result, the O-ring 152 is positioned outside the yoke (above the circular plate 139) even when the solenoid 104 is in the ON state. Hence, achieved is a structure that is less likely to suffer from a loss of magnetic properties. In a modification, the arrangement may be such that the O-ring 152 and the yoke may partially overlap with each other as long as the loss of magnetic properties is less than or equal to a predetermined reference value. For example, the arrangement may be such that a magnetic path that does not involve the O-ring in between the circular plate 139 and the plunger 134 can be provided although the O-ring 152 and the circular plate 139 partially overlap radially with each other in the state where the plunger 34 is closest to the core 130.

The aforementioned guide member 119 is fixed in such a manner that a lower end of the core 130 is swaged outward. The valve element 118 is inserted to the guide member 119 in a slidable manner. By employing such a structure as described above, a back pressure chamber 154 is formed into a partition or compartment between the valve element 118 and the guide member 119. The back pressure chamber 154 communicates with the back pressure chamber 146 through the clearance between the core 130 and the actuating rod 142, the space between the core 130 and the plunger 134, the communicating groove 143, and the communicating path 144. A communicating hole 122, which communicates between the back pressure chamber 154 and a pressure chamber on an upstream side and which also functions as a "leak passage", is formed in the base of the valve element 118. Thus, when the control valve 101 is in a mode in which it is controlled as shown in FIG. 2, the back pressure chamber 154 is filled with the fluid having an upstream-side pressure Pin.

While the solenoid 104 is turned off (electrically not conducting) as illustrated in FIG. 1, no suction power between the core 130 and the plunger 134 is in effect in the control valve 101 configured as described above. Thus, the valve element 118 is biased in the vale opening direction and is fully opened. On the other hand, while the solenoid 104 is turned on (electrically conducting) as illustrated in FIG. 2, the suction force is created between the core 130 and the plunger 134 and therefore the solenoidal force is directly conveyed to the valve element 118 by way of the actuating rod 142. As a result, the valve element 118 is driven in a valve closing direction.

In the present embodiment, the fluid at the upstream-side pressure Pin is introduced in the back pressure chamber 154 through the communicating hole 122. Thus, even if there is a pressure difference (Pin−Pout) between the upstream-side pressure Pin and the downstream-side pressure Pout, the majority of effects of the pressure difference acting on the valve element 118 will be canceled out. Hence, the valve element 118 can be driven by a relatively small solenoidal force. A cross-sectional area B (see FIG. 2) corresponds to a cross-sectional area that is defined when the inside diameter of a sliding portion of the valve element 118 relative to the guide member 119 is set as the diameter. Note that in the present embodiment a cross-sectional area A (also see FIG. 2) and the cross-sectional area B are both set to a practically identical value.

Also, the communicating hole 122 is made as small as possible in the present embodiment. Thus, achieved in the present embodiment is a damper function of relaxing the movement of the valve element 118 by leading in the refrigerant toward the back pressure chamber 154 through the communicating hole 122 and leading out the refrigerant from the back pressure chamber 154 therethrough. In the present embodiment, the ratio of the conducting time (on time) and the nonconducting time (off time) of the solenoid 104 in the control valve, namely on/off duty ratio, is adjusted, so that an average pressure difference, which is an average value of pressure differences before and after the on/off is controlled to an appropriate value.

Figure 3:
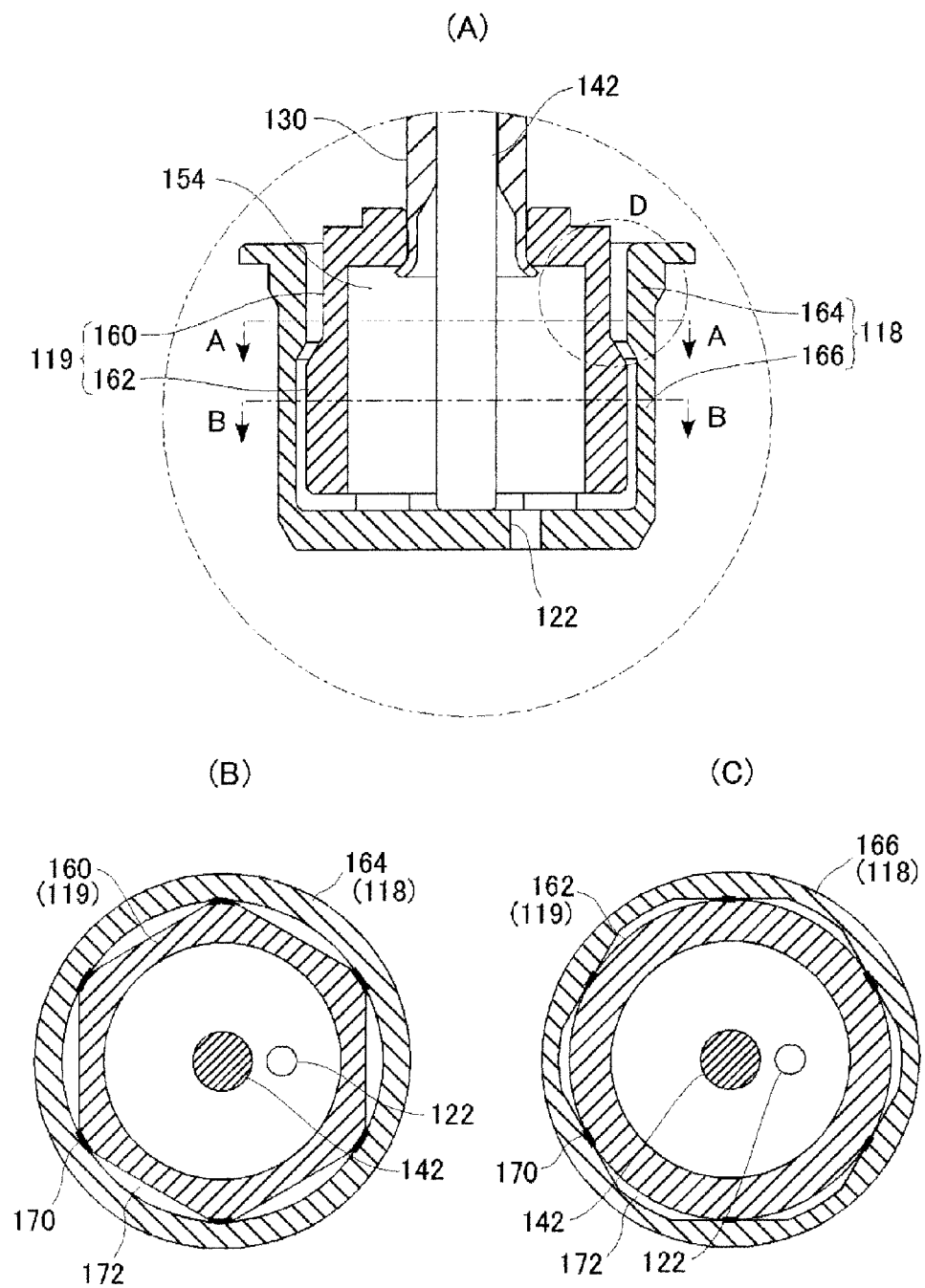
FIGS. 3A to 3C are each a partially enlarged sectional view showing structure and operation of a sliding portion of a valve element.
Figure 4:
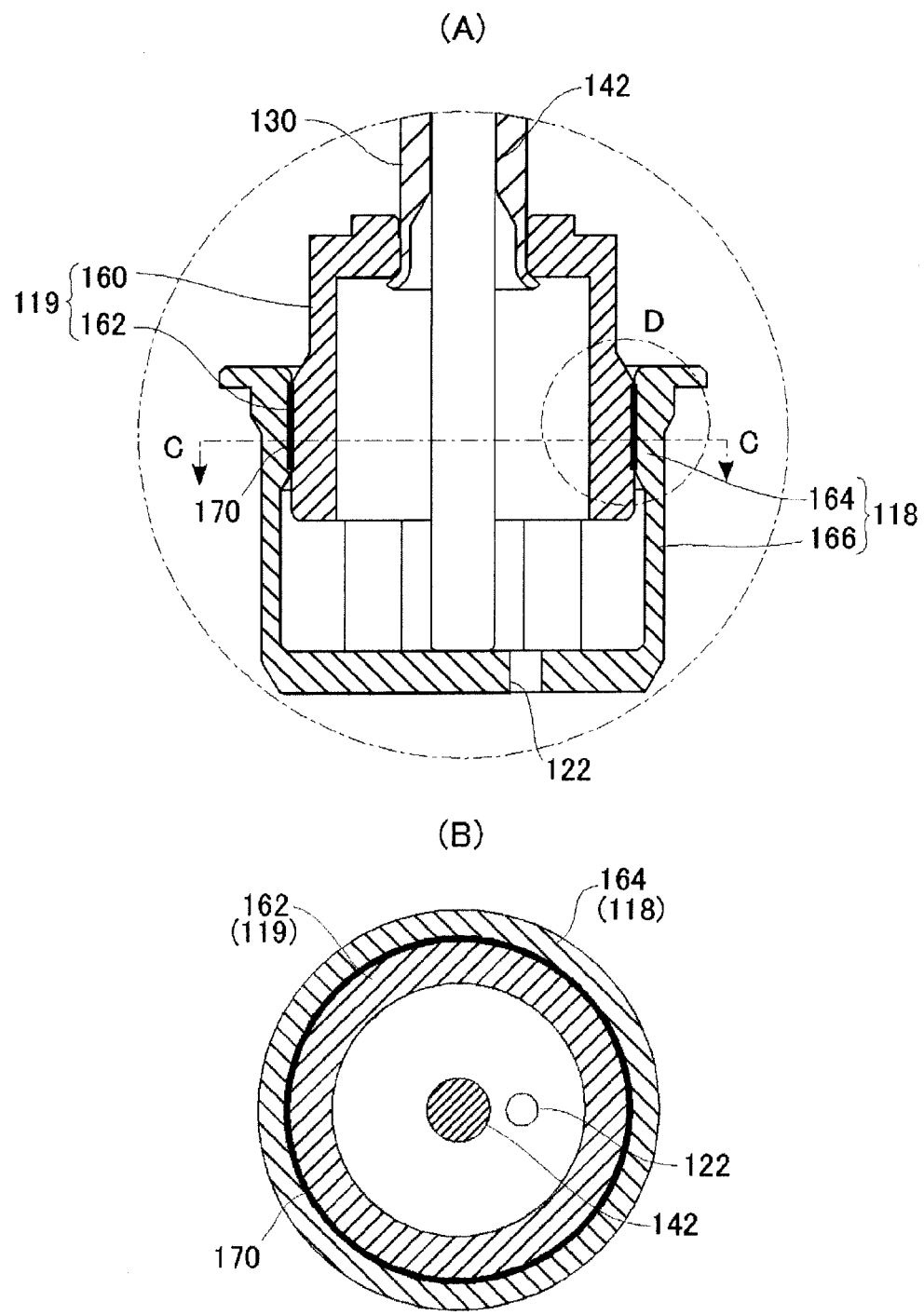
FIGS. 4A and 4B are each a partially enlarged sectional view showing structure and operation of a sliding portion of a valve element.

A detailed description is now given of structures and operations of major components in the present embodiment. FIGS. 3A to 3C and FIGS. 4A and 4B are each a partially enlarged sectional view showing structure and operation of a sliding portion of a valve element. FIG. 3A corresponds to FIG. 1 and is a partially enlarged sectional view showing a state where the solenoid 104 is turned off. FIG. 3B is a cross-sectional view taken along the line A-A and viewed on the side shown by the arrows of FIG. 3A, and FIG. 3C is a cross-sectional view taken along the line B-B and viewed on the side shown by the arrows of FIG. 3A. FIG. 4A corresponds to FIG. 2 and is a partially enlarged sectional view showing a state where the solenoid 104 is turned on. FIG. 4B is a cross-sectional view taken along the line C-C and viewed on the side shown by the arrows of FIG. 4A.

As shown in FIGS. 3A to 3C, the outer circumference of upper half 160 of the guide member 119 is roughly hexagon in shape, and the outer circumference of lower half 162 thereof is circle in shape. The head portions of the outer circumference of upper half 160 are of a round shape, and the diameter of a circumscribed circle connecting the respective head portions thereof is set equal to the outside diameter of the lower half 162. The inner circumference of upper half 164 of the valve element 118 is circle in shape, and the inner circumference of lower half 166 thereof is polygon in shape (roughly 12-sided polygon in shape in the present embodiment) larger than the upper half 164. The diameter of an inscribed circle of the lower half 166 is set equal to the inside diameter of the upper half 164.

As shown in FIGS. 4A and 4B, the inside diameter of an inner circumferential surface of the upper half 164 of the valve element 118 is practically identical to the outside diameter of an outer circumferential surface of the lower part 162 of the valve element 119. As the upper half 164 of the valve element 118 is displaced to their counter position of the lower part 162 of the guide member 119, the both have shapes complementary to their respective abutting surfaces over the entire circumference.

By employing such a structure as described above, in an overlapped portion which is a region where the valve element 118 and the guide member 119 overlap radially with each other, a sliding portion 170 (marked with thick lines) and a spacing 172 are formed in between the inner circumferential surface of the valve element 118 and the outer circumferential surface of the guide member 119. While the solenoid 104 is turned off and the valve is open, the proportion of the spacings 172 occupied in the overlapped portion where the valve element 118 and the guide member 119 overlap with each other is larger than the proportion of the sliding portions 170 occupied in the overlapped portion, as shown in FIGS. 3B and 3C. As a result, the refrigerant introduced from the communicating hole 122 passes through the spacing 172 and is more likely to be discharged outside the back pressure chamber 154.

While, on the other hand, the solenoid 104 is turned on and the valve is closed, the sliding portion 170 is connected circumferentially in the overlapped portion where the valve element 118 and the guide member 119 overlap with each other. In this case, the cross section of the clearance of the sliding portion 170 is smaller than that of the communicating hole 122, so that the pressure of the back pressure chamber 154 is stably kept at the upstream-side pressure Pin.

Figure 5:
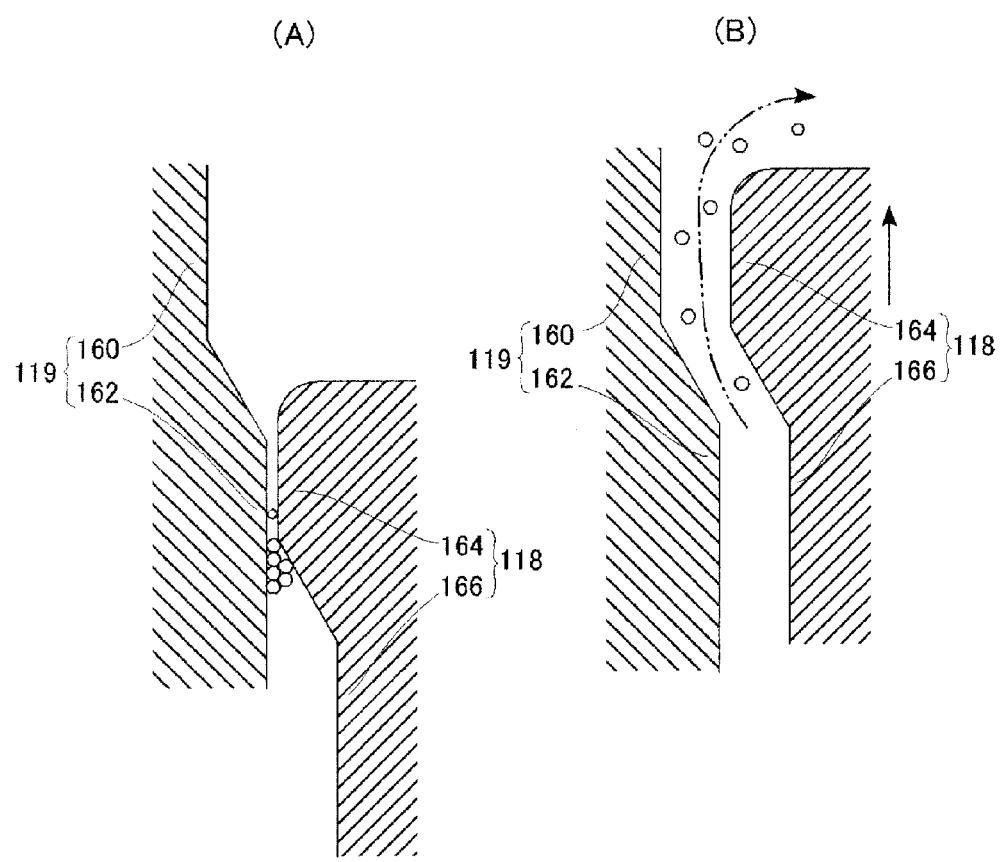
FIGS. 5A and 5B are each a diagram for explaining a discharge function of foreign material in a sliding portion of a valve element.

FIGS. 5A and 5B are diagrams for explaining a discharge function of foreign material in the sliding portion of the valve element. FIG. 5A is an enlarged view of a region marked with circle D in FIG. 4A, and FIG. 5B is an enlarged view of a region marked with circle D in FIG. 3A.

When the open/close status of the valve section or valve element transits from "closed" to "open", the status of the overlapped portion where the valve element 118 and the guide member 119 overlap with each other changes from the state as shown in FIG. 5A to the state as shown in FIG. 5B. That is, the clearance between the valve element 118 and the guide member 119 gets larger and therefore the refrigerant is more likely to be discharged through the spacing between the valve element 118 and the guide member 119. Thus, the discharge of foreign material (see while circles) can be promoted as illustrated in FIG. 5B (see two-dot chain line arrow), if the foreign material stays on between the valve element 118 and the guide member 119.

Second Embodiment

A control valve according to a second embodiment has a structure similar to that of the control valve according to the first embodiment except that the structures of a valve element and a guide member differ from those of the first embodiment. Thus, the structural components of the second embodiment approximately similar to those of the first embodiment are given the identical reference numerals and the description thereof is omitted. FIGS. 6A to 6C and FIGS. 7A and 7B are each a partially enlarged sectional view showing structure and operation of components surrounding the valve element according to the second embodiment. FIG. 6A is a partially enlarged sectional view of the components surrounding the valve element in a state where the solenoid is turned off. FIG. 6B is a cross-sectional view taken along the line A-A and viewed on the side shown by the arrows of FIG. 6A, and FIG. 6C is a cross-sectional view taken along the line B-B and viewed on the side shown by the arrows of FIG. 6A. FIG. 7A is a partially enlarged sectional view of the components surrounding the valve element in a state where the solenoid is turned on. FIG. 7B is a cross-sectional view taken along the line C-C and viewed on the side shown by the arrows of FIG. 7A.

In the second embodiment, a valve element 218 is used in place of the valve element 118 of the first embodiment, and a guide member 219 is used in place of the guide member 119. As shown in FIGS. 6A to 6C, the control valve according to the second embodiment is configured such that the cross section of an upper half 260 of the guide member 219 is in a ring shape and such that the outside diameter of the upper half 260 of the guide member 219 is smaller than the inside diameter of an upper half 164 of the valve element 218. Also, the cross section of a lower half 266 of the valve element 218 is in a ring shape, and the inside diameter of the lower half 266 of the valve element 218 is larger than the outside diameter of a lower half 162 of the guide member 219. Thus, while the solenoid 104 is turned off and the valve is open, the spacing 172 is formed over the overlapped portion in its entirety thereof. Hence, the refrigerant in the back pressure chamber 154 is more likely to be discharged to the outside, as compared with the case of the first embodiment.

Figure 6:
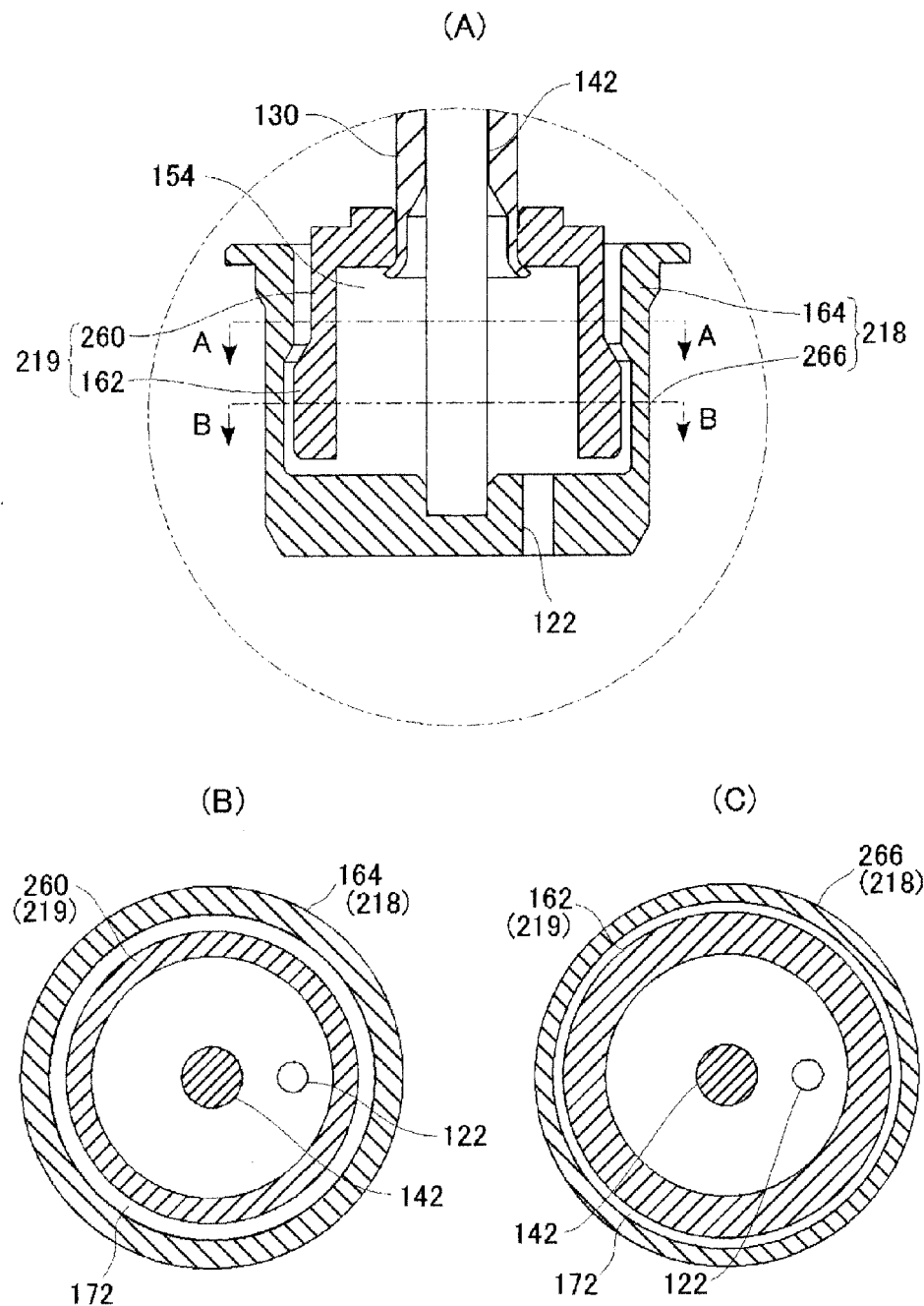
FIGS. 6A to 6C are each a partially enlarged sectional view showing structure and operation of components surrounding a valve element according to a second embodiment.
Figure 7:
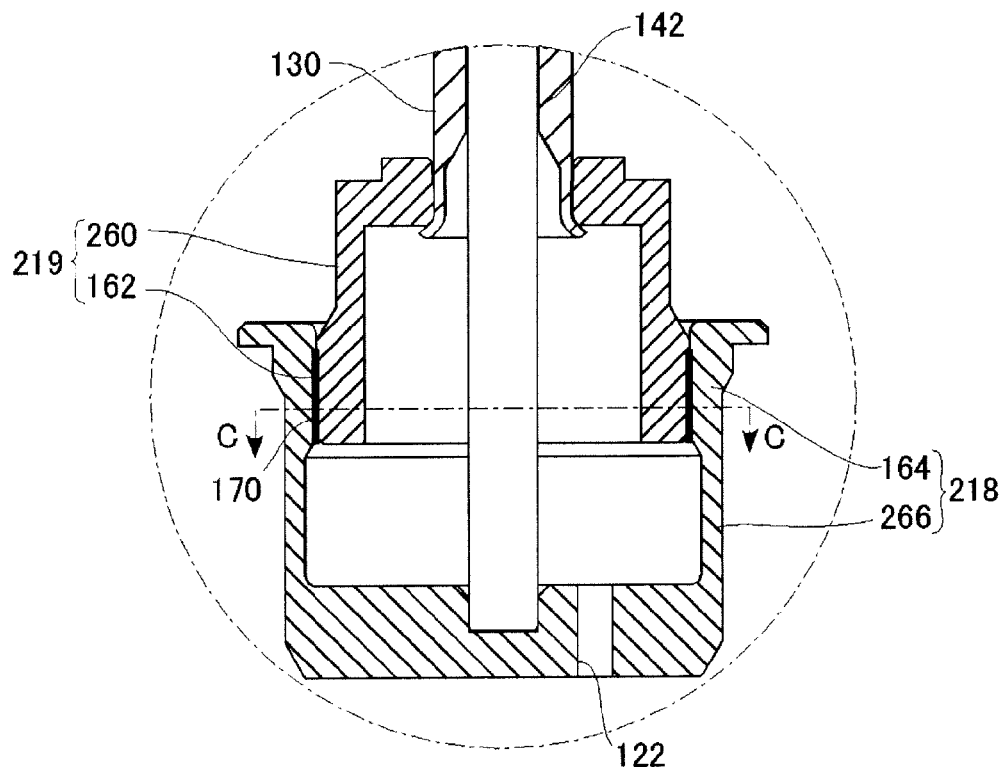
FIGS. 7A and 7B are each a partially enlarged sectional view showing structure and operation of components surrounding a valve element according to a second embodiment.
Figure 7:
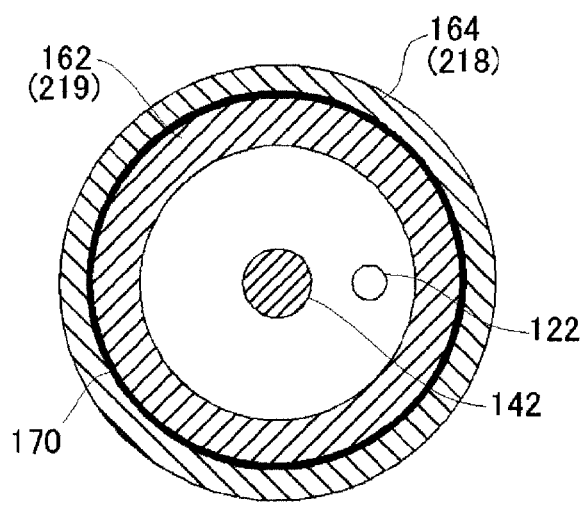

In the present embodiment as shown in FIGS. 6A to 7B, a lower end of the actuating rod 142 is press-fitted to a bottom center of the valve element 218 and thereby the valve element 218 is fixed to the actuating rod 142. Thus, a stable operation of the valve element 218 in the direction of axis line can be maintained even in the state where the valve is being open as illustrated in FIGS. 6A to 6C.

On the other hand, the inside diameter of the upper half 164 of the valve element 218 and the diameter of the lower half 162 of the guide member 219 are set to an approximately identical value. Thus, while the solenoid 104 is turned on and the valve is closed, the sliding portion 170 is connected circumferentially in the overlapped portion where the valve element 218 and the guide member 219 overlap with each other.

In other words, by employing the control valve according the present embodiment, the state where the sliding portion 170 is connected circumferentially in the overlapped portion is formed while the valve is closed. And the spacing 172 is formed over the overlapped portion in its entirety thereof while the valve is open. Thus, should foreign material stay on between the valve element 218 and the guide member 219 during a valve closed period, the foreign material can be promptly discharged by opening the valve section.

Third Embodiment

Figure 8:
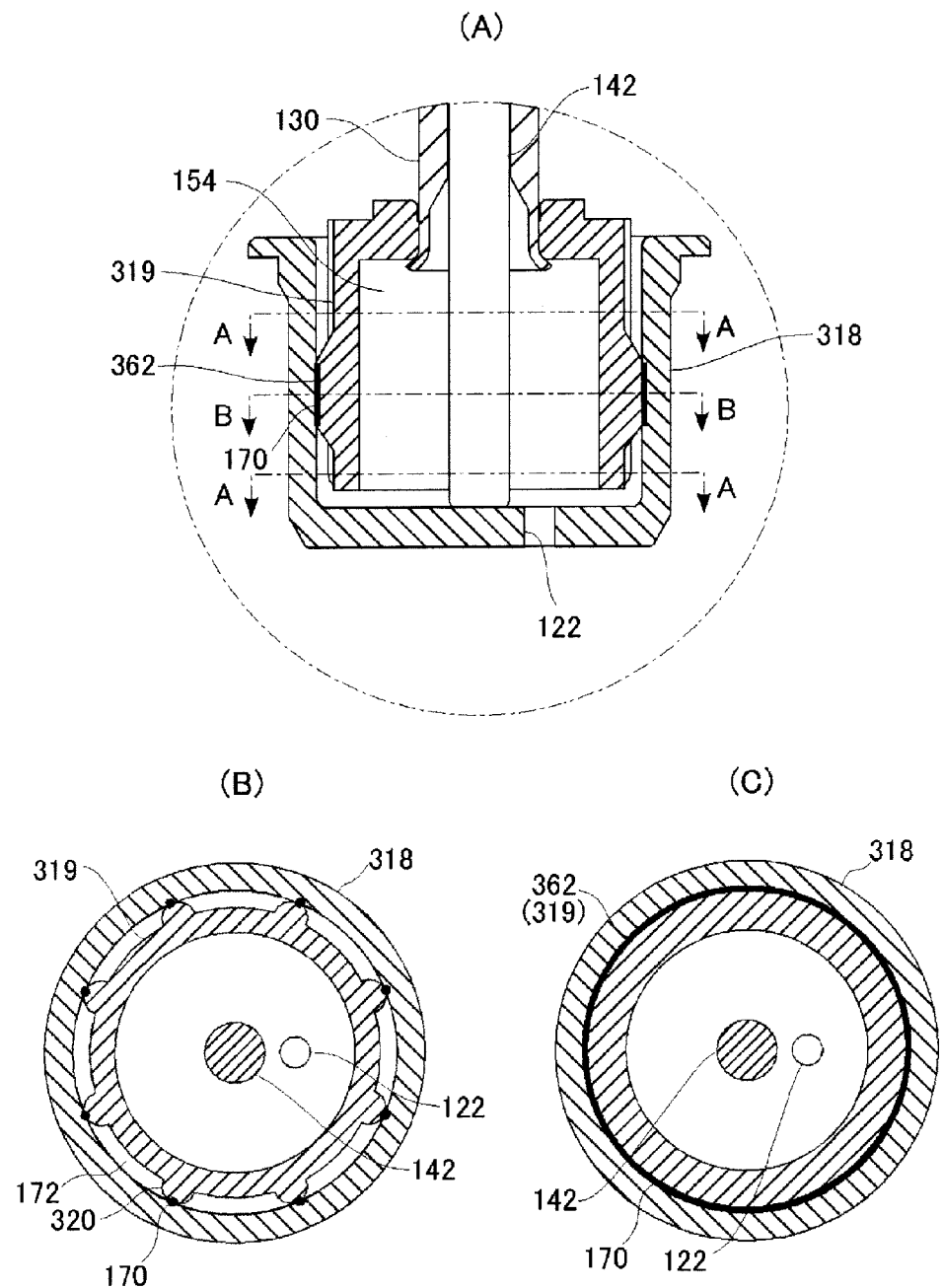
FIGS. 8A to 8C are each a partially enlarged sectional view showing structure and operation of components surrounding a valve element according to a third embodiment.
Figure 9:
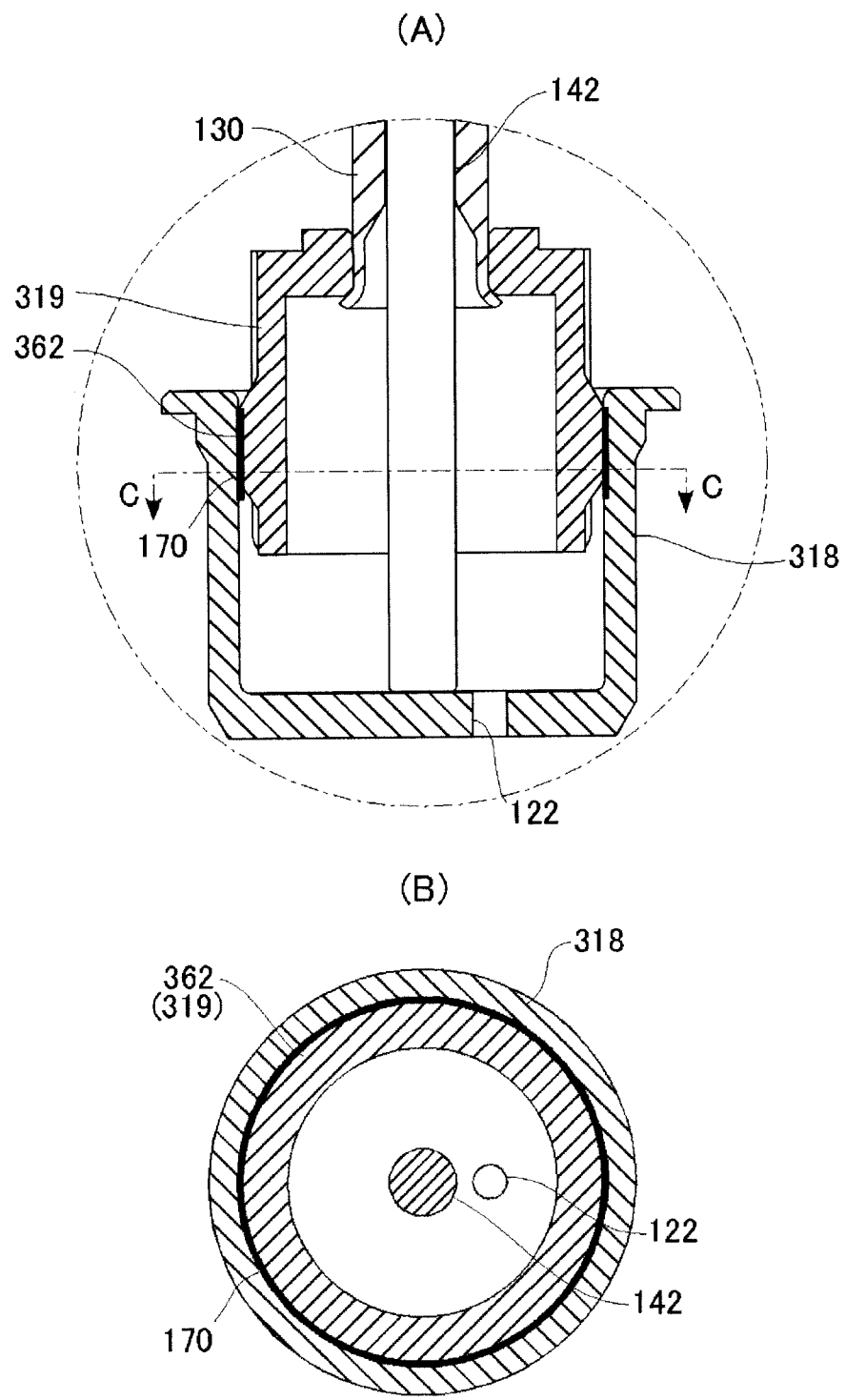
FIGS. 9A and 9B are each a partially enlarged sectional view showing structure and operation of components surrounding a valve element according to a third embodiment.

A control valve according to a third embodiment has a structure similar to that of the control valve according to the first embodiment except that the structures of a valve element and a guide member differ from those of the first embodiment. Thus, the structural components of the third embodiment approximately similar to those of the first embodiment are given the identical reference numerals and the description thereof is omitted. FIGS. 8A to 8C and FIGS. 9A and 9B are each a partially enlarged sectional view showing structure and operation of components surrounding the valve element according to the third embodiment. FIG. 8A is a partially enlarged sectional view of the components surrounding the valve element in a state where the solenoid is turned off. FIG. 8B is a cross-sectional view taken along the line A-A and viewed on the side shown by the arrows of FIG. 8A, and FIG. 8C is a cross-sectional view taken along the line B-B and viewed on the side shown by the arrows of FIG. 8A. FIG. 9A is a partially enlarged sectional view of the components surrounding the valve element in a state where the solenoid is turned on. FIG. 9B is a cross-sectional view taken along the line C-C and viewed on the side shown by the arrows of FIG. 9A.

In the third embodiment, a valve element 318 is used in place of the valve element 118 of the first embodiment, and a guide member 319 is used in place of the guide member 119. As shown in FIGS. 8A to 8C, the cross section of the valve element 318 is formed in a ring shape, and the inside diameter of the valve element 318 is constant all over across the direction of axis line. Raised-surface portions 362 are provided peripherally in a middle part of the guide member 319 along the direction of axis line. The outside diameter of the raised-surface portions 362 and the inside diameter of the valve element 318 are set to an approximately identical value so that the raised-surface portions 362 can abut against the inner circumferential surface of the valve element 318 over the entire circumference. A laterally extending upper portion and a laterally extending lower portion from the raised-surface portion 362 on the outer circumferential surface of the guide member 319, raised-surface portions (protrusions) 320 are provided peripherally, at equal intervals therebetween, in parallel with the direction of axis line. In the present embodiment, the eight protrusions 320 are provided at every 45 degrees on a circle with the axis line as the center, and the diameter of a circumscribed circle connecting the tips of the respective protrusions 320 is set approximately equal to the inside diameter of the valve element 318.

By employing such a structure as described above, the raised surface portions 362 of the guide member 319 constantly abut against the inner circumferential surface of the valve element 318 during both the valve opening period as in FIGS. 8A to 8C and the valve closed period as in FIGS. 9A and 9B. Also, the sliding portion 170 is constantly connected circumferentially in a part of the overlapped portion where the valve element 318 and the guide member 319 overlap with each other, during both the valve opening period as in FIGS. 8A to 8C and the valve closed period as in FIGS. 9A and 9B. As a result, if the foreign material stays on between the valve element 318 and the guide member 319, the discharge of foreign material cannot be promoted as with the first and second embodiments. Nevertheless, since the raised-surface portion 362 is provided only in a partial region along the direction of axis line, the relatively large spacings 172 are formed above and below the raised-surface portion 362. Hence, the foreign material will be entangled together in a process where the valve element 318 moves in a valve opening direction, and the thus entangled foreign material is eventually pushed out to the outside. This third embodiment is more advantageous than a case where the valve element and the guide member abut against each other almost all over the entire region along the direction of axis line. That is, in the third embodiment, the foreign material is more likely to be discharged as compared with the above case.

Fourth Embodiment

Figure 10:
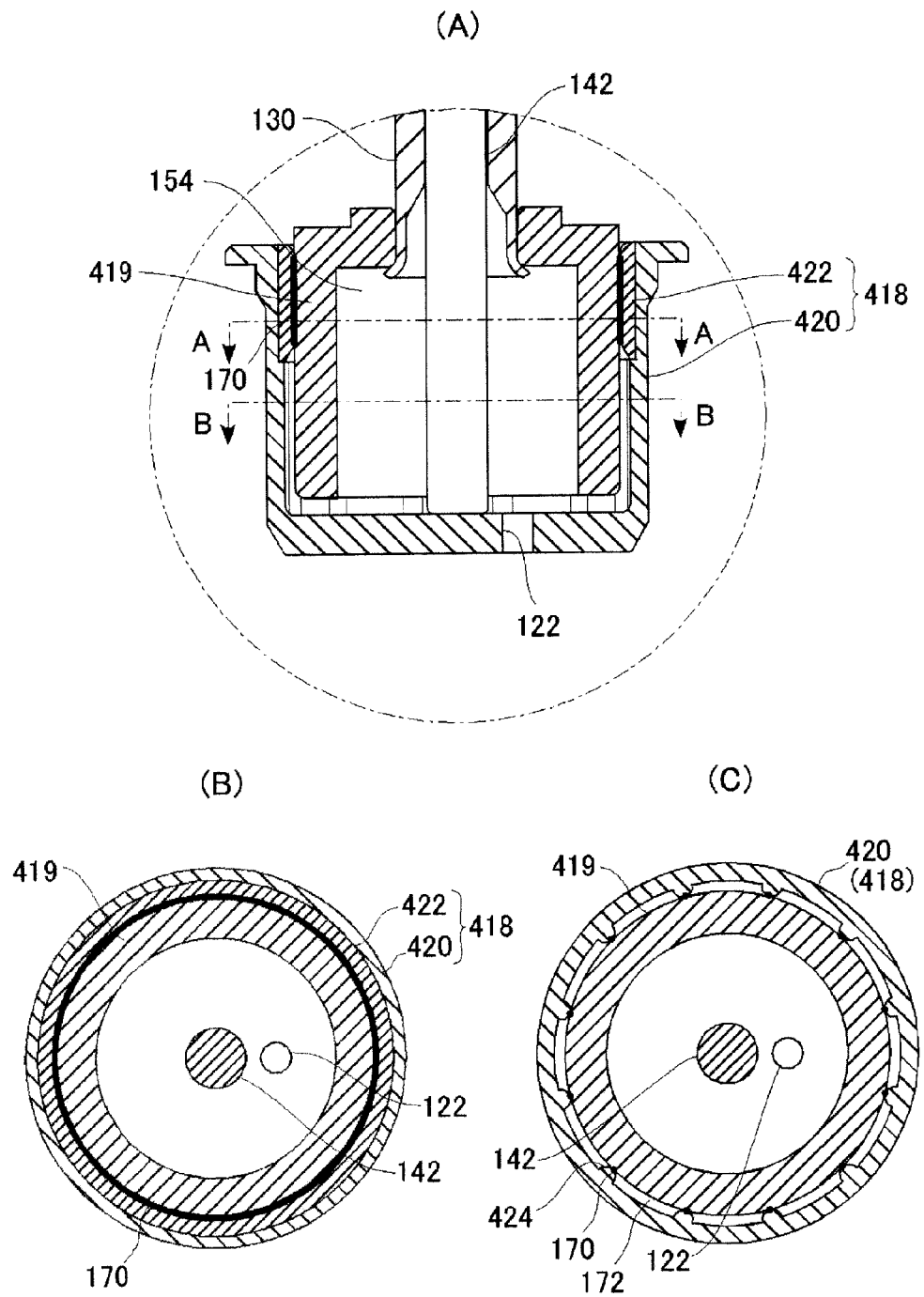
FIGS. 10A to 10C are each a partially enlarged sectional view showing structure and operation of components surrounding a valve element according to a fourth embodiment.
Figure 11:
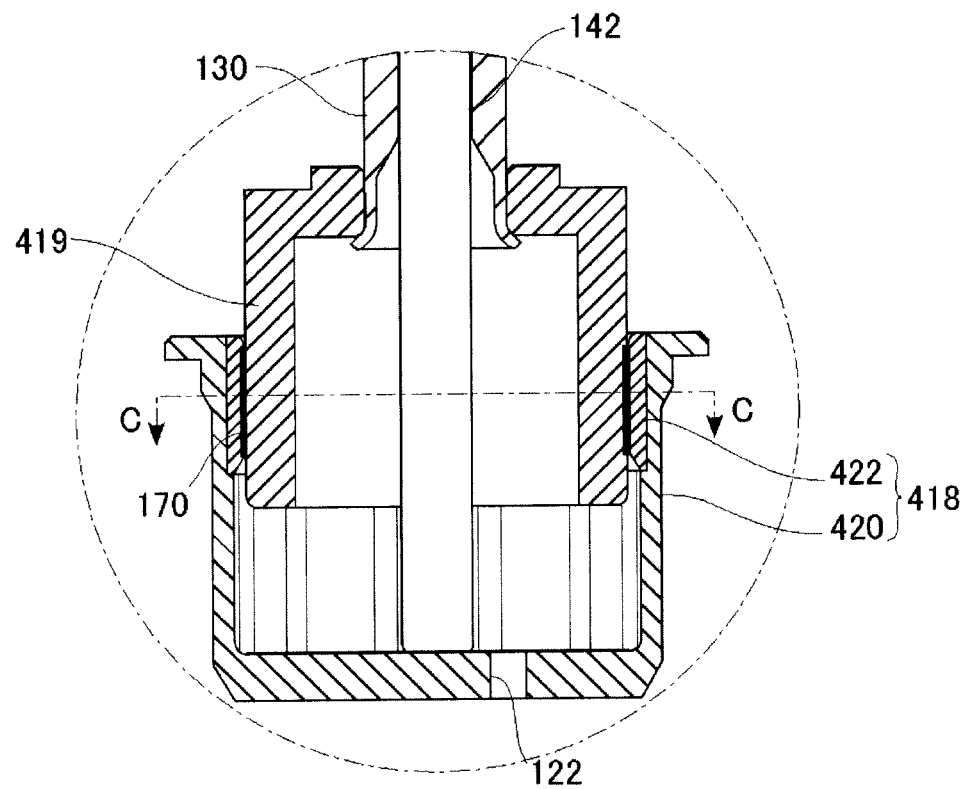
FIGS. 11A and 11B are each a partially enlarged sectional view showing structure and operation of components surrounding a valve element according to a fourth embodiment.
Figure 11:
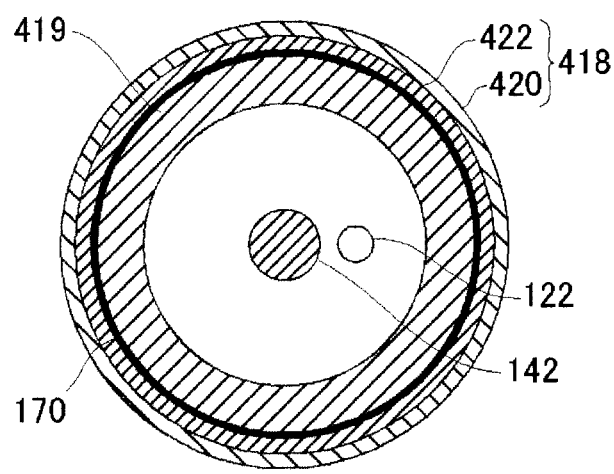

A control valve according to a fourth embodiment has a structure similar to that of the control valve according to the first embodiment except that the structures of a valve element and a guide member differ from those of the first embodiment. Thus, the structural components of the fourth embodiment approximately similar to those of the first embodiment are given the identical reference numerals and the description thereof is omitted. FIGS. 10A to 10C and FIGS. 11A and 11B are each a partially enlarged sectional view showing structure and operation of components surrounding the valve element according to the fourth embodiment. FIG. 10A is a partially enlarged sectional view of the components surrounding the valve element in a state where the solenoid is turned off. FIG. 10B is a cross-sectional view taken along the line A-A and viewed on the side shown by the arrows of FIG. 10A, and FIG. 10C is a cross-sectional view taken along the line B-B and viewed on the side shown by the arrows of FIG. 10A. FIG. 11A is a partially enlarged sectional view of the components surrounding the valve element in a state where the solenoid is turned on. FIG. 11B is a cross-sectional view taken along the line C-C and viewed on the side shown by the arrows of FIG. 11A.

In the fourth embodiment, a valve element 418 is used in place of the valve element 118 of the first embodiment, and a guide member 419 is used in place of the guide member 119. As shown in FIGS. 10A to 10C, the cross section of the guide member 419 is formed in a ring shape, and the outside diameter of the guide member 419 is constant all over across the direction of axis line. On the other hand, the valve element 418 is constituted by assembling a bottomed body 420 of a cylindrical shape and a sliding member 422 of a cylindrical shape such that the sliding member 422 is inserted into the body 420. The sliding member 422 is press-fitted to an upper half of the body 420. And the inside diameter of the sliding member 422 is practically identical to the outside diameter of the guide member 419, and the inner circumferential surface of the sliding member 422 is raised-surface portions abutting against the outer circumferential surface of the guide member 419 over the entire circumference. On the inner circumferential surface of a lower half of the body 420, protrusions 424 are provided peripherally, at equal intervals therebetween, in parallel with the direction of axis line. In the present embodiment, the twelve protrusions 424 are provided at every 30 degrees on a circle with the axis line as the center, and the diameter of an inscribed circle connecting the tips of the respective protrusions 424 is set approximately equal to the outside diameter of the guide member 419.

By employing such a structure as described above, the inner circumferential surface (raised-surface portions) of the sliding member 422 and the outer circumferential surface of the guide member 419 constantly abut against each other during both the valve opening period as in FIGS. 10A to 10C and the valve closed period as in FIGS. 11A and 11B. Also, the sliding portion 170 is constantly connected circumferentially in the overlapped portion where the valve element 418 and the guide member 419 overlap with each other, during both the valve opening period as in FIGS. 10A to 10C and the valve closed period as in FIGS. 11A and 11B. As a result, if the foreign material stays on between the valve element 418 and the guide member 419, the discharge of foreign material cannot be promoted as with the first and second embodiments. Nevertheless, since the sliding member 422 is provided on an opening end only, this fourth embodiment is more advantageous than a case where the valve element and the guide member abut against each other almost all over the entire region along the direction of axis line; that is, in the fourth embodiment, the foreign material is more likely to be discharged as compared with that case. Also, since the valve element 418 is constituted by assembling the body 420 and the sliding member 422 that have been formed separately, the fourth embodiment is advantageous in that the raised-surface portion is formed with ease.

Fifth Embodiment

Figure 12:
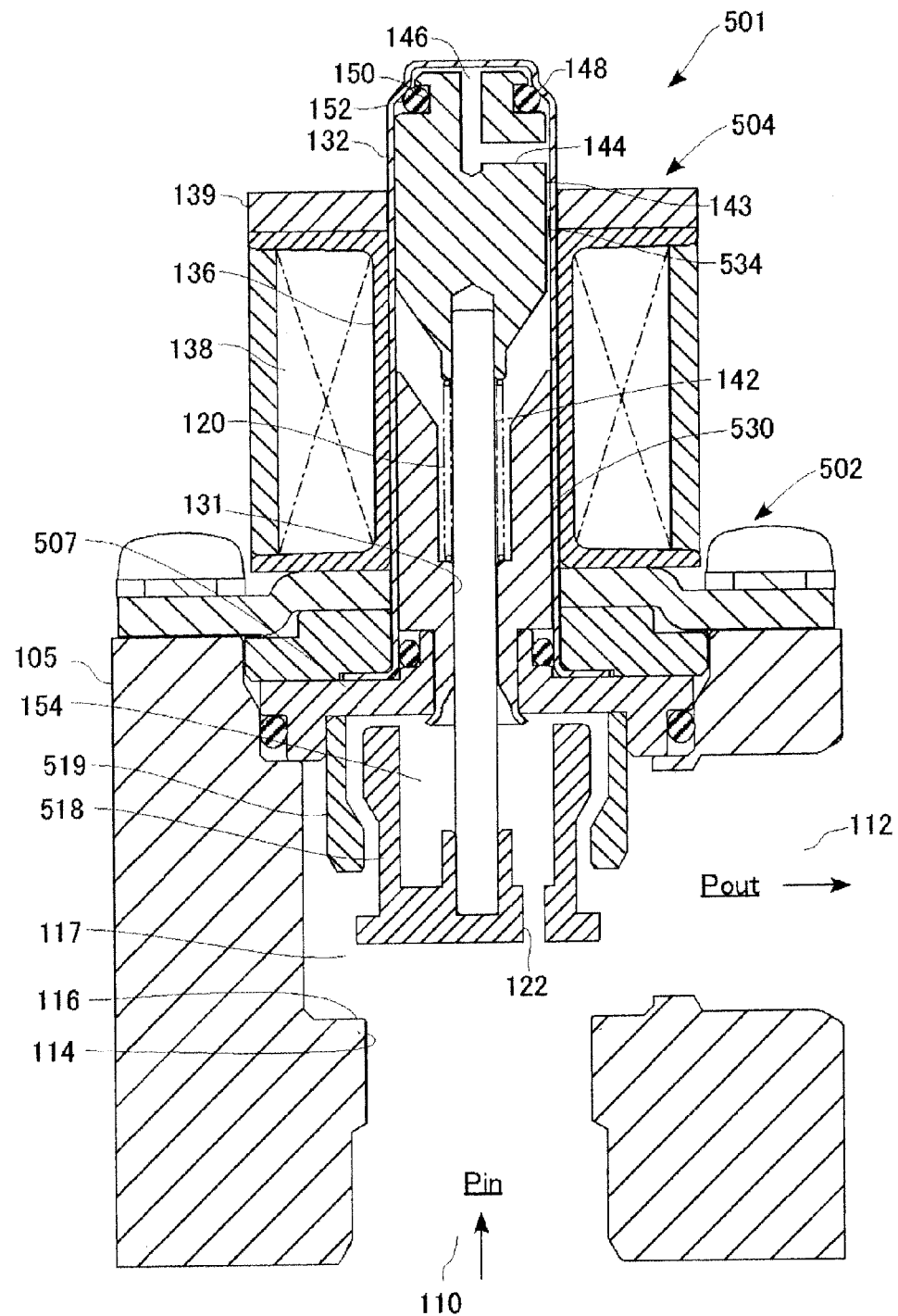
FIG. 12 is a cross-sectional view showing a concrete structure and operation of a control valve according to a fifth embodiment.
Figure 13:
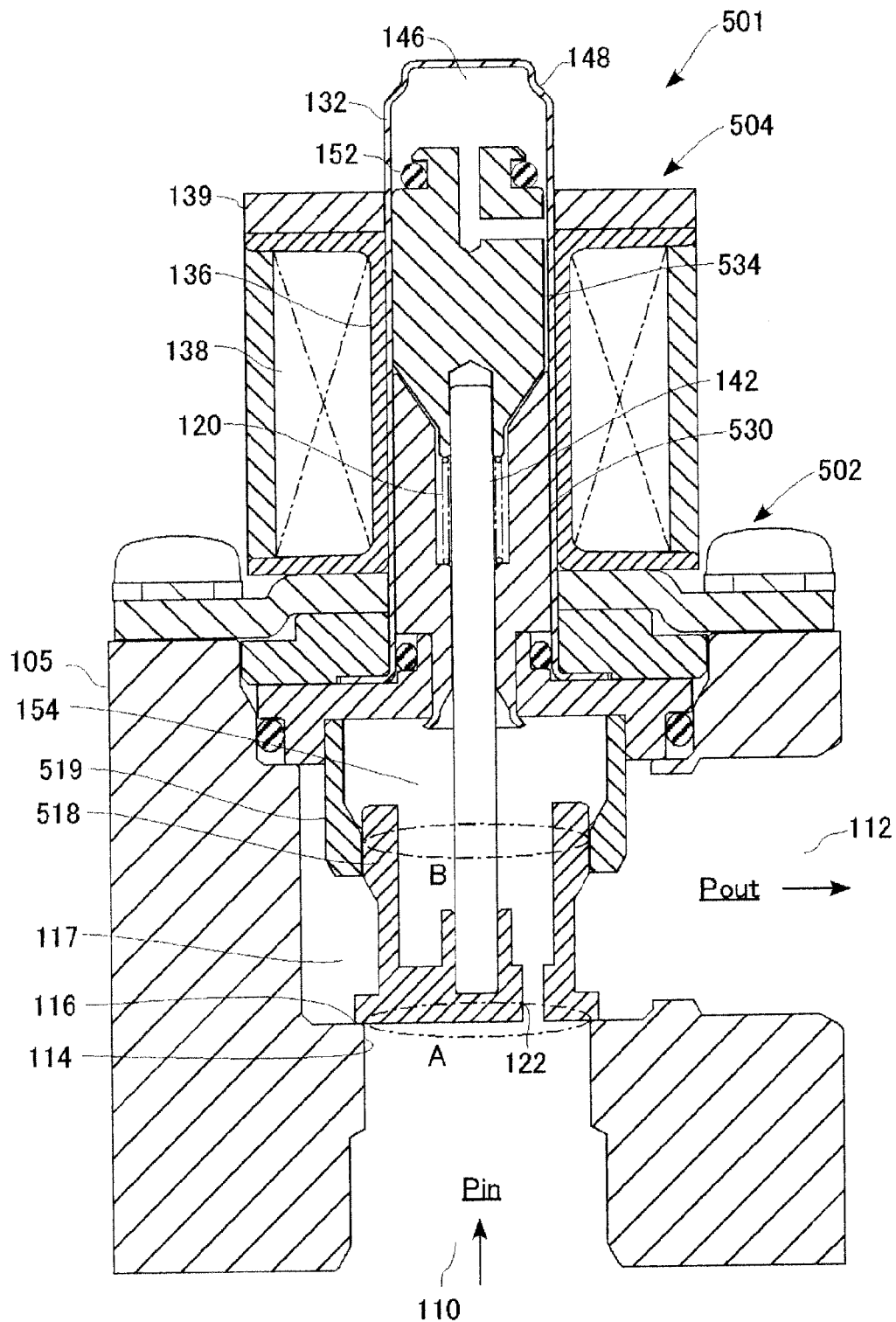
FIG. 13 is a cross-sectional view showing a concrete structure and operation of a control valve according to a fifth embodiment.

A control valve according to a fifth embodiment has a structure similar to that of the control valve according to the first embodiment except that the structures of a valve element and a guide member differ from those of the first embodiment. Thus, the structural components of the fifth embodiment approximately similar to those of the first embodiment are given the identical reference numerals and the description thereof is omitted. FIG. 12 and FIG. 13 are each a cross-sectional view showing the concrete structure and operations of a control valve according to the fifth embodiment.

As shown in FIG. 12, a control valve 501 is constituted by integrally assembling a valve unit 502 and a solenoid 504. A guide member 519 is fixed to a connection member 507 that closes the opening of the body 105. The guide member 519 extends downward in a direction toward the pressure chamber 117, and the valve element 518 is inserted into the guide member 519 in a slidable manner relative to the guide member 519. In other words, in the present embodiment, the guide member 519 is located outside the valve element 518.

In the present embodiment, too, the cross sectional area A of the valve hole 114 is set practically equal to the cross-sectional area B defined when the outside diameter of a sliding portion of the valve element 518 relative to the guide member 519 is set as the diameter. Hence, the majority of effects of the pressure of the refrigerant acting on the valve element 518 is canceled out.

The actuating rod 142 is such that an upper end of the actuating rod 142 is press-fitted to a lower surface of the plunger 534 and such that a lower end of the actuating rod 142 is press-fitted to a base of the valve element 518. That is, the actuating rod 142 is fixed to both the plunger 534 and the valve element 518. The spring 120 is set between the core 530 and plunger 534, and the spring 120 biases the valve element 518 in a valve opening direction through the plunger 534.

While the solenoid 504 is turned off as illustrated in FIG. 12, no suction power between the core 530 and the plunger 534 is in effect in the control valve 501. Thus, the valve element 518 is fully opened under the effect of the biasing force of the spring 120. On the other hand, while the solenoid 504 is turned on as illustrated in FIG. 13, the suction force is created between the core 530 and the plunger 534 and therefore the solenoidal force is directly conveyed to the valve element 518 by way of the actuating rod 142. As a result, the valve element 518 is driven in a valve closing direction.

Figure 14:
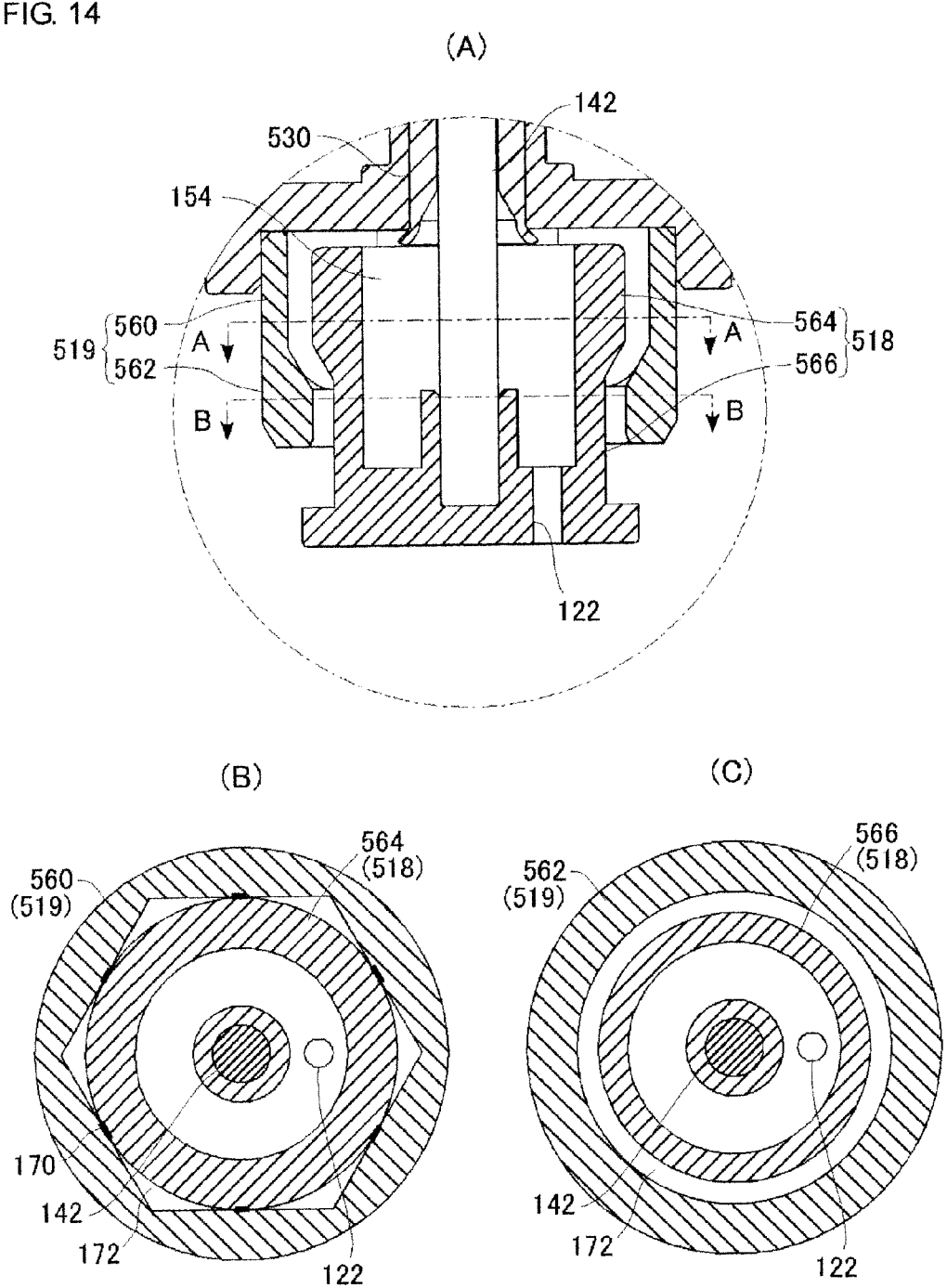
FIGS. 14A to 14C are each a partially enlarged sectional view showing structure and operation of components surrounding a valve element.
Figure 15:
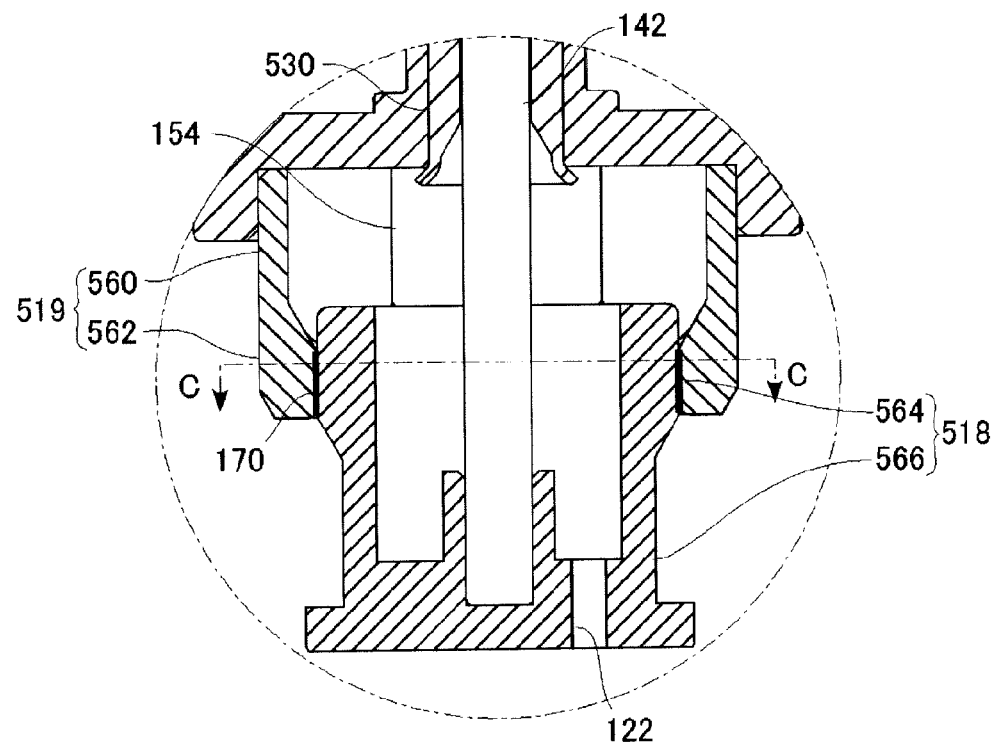
FIGS. 15A and 15B are each a partially enlarged sectional view showing structure and operation of components surrounding a valve element.
Figure 15:
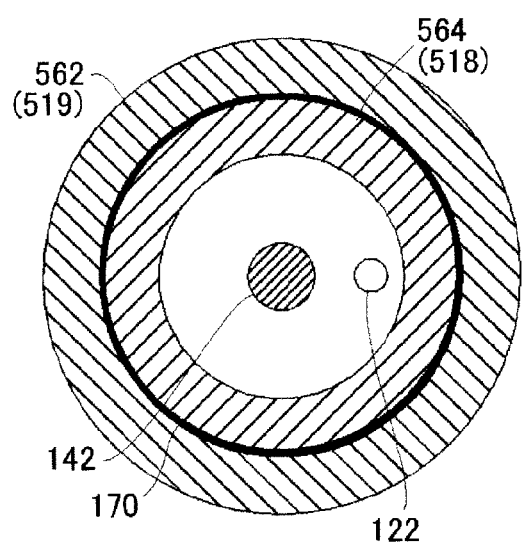

FIGS. 14A to 14C and FIGS. 15A and 15B are each a partially enlarged sectional view showing structure and operation of components surrounding a valve element. FIG. 14A is a partially enlarged sectional view of the components surrounding the valve element in a state where the solenoid is turned off. FIG. 14B is a cross-sectional view taken along the line A-A and viewed on the side shown by the arrows of FIG. 14A, and FIG. 14C is a cross-sectional view taken along the line B-B and viewed on the side shown by the arrows of FIG. 14A. FIG. 15A is a partially enlarged sectional view of the components surrounding the valve element in a state where the solenoid is turned on. FIG. 15B is a cross-sectional view taken along the line C-C and viewed on the side shown by the arrows of FIG. 15A.

As shown in FIGS. 14A to 14C, the inner circumference of upper half 560 of the guide member 519 is hexagon in shape, and the inner circumference of lower half 562 thereof is circle in shape. The diameter of an inscribed circle of the upper half 560 is set equal to the inside diameter of the lower half 562. The cross sections of an upper half 564 and a lower half 566 of the valve element 518 are both in a ring shape, and the outside diameter of the lower half 566 is set smaller than that of the upper half 564.

As shown in FIGS. 15A and 15B, the outside diameter of an outer circumferential surface of the upper half 564 of the valve element 518 is practically identical to the inside diameter of an inner circumferential surface of the lower part 562. As the upper half 564 of the valve element 518 is displaced to their counter position of the lower part 562 of the guide member 519, the both have shapes complementary to their respective abutting surfaces over the entire circumference.

By employing such a structure as described above, during a valve closed period as in FIGS. 15A and 15B, the sliding portion 170 is connected circumferentially in the overlapped portion where the valve element 518 and the guide member 519 overlap with each other. On the other hand, during a valve opening period as in FIGS. 14A to 14C, the sliding portion 170 and the spacing 172 are formed in the overlapped portion where the valve element 518 and the guide member 519 overlap with each other. During this valve opening period, the proportion of the spacings 172 occupied in the overlapped portion where the valve element 518 and the guide member 519 overlap with each other is larger than the proportion of the sliding portions 170 occupied in the overlapped portion. As a result, the refrigerant introduced from the communicating hole 122 passes through the spacing 172 and is more likely to be discharged outside the back pressure chamber 154.

Sixth Embodiment

Figure 16:
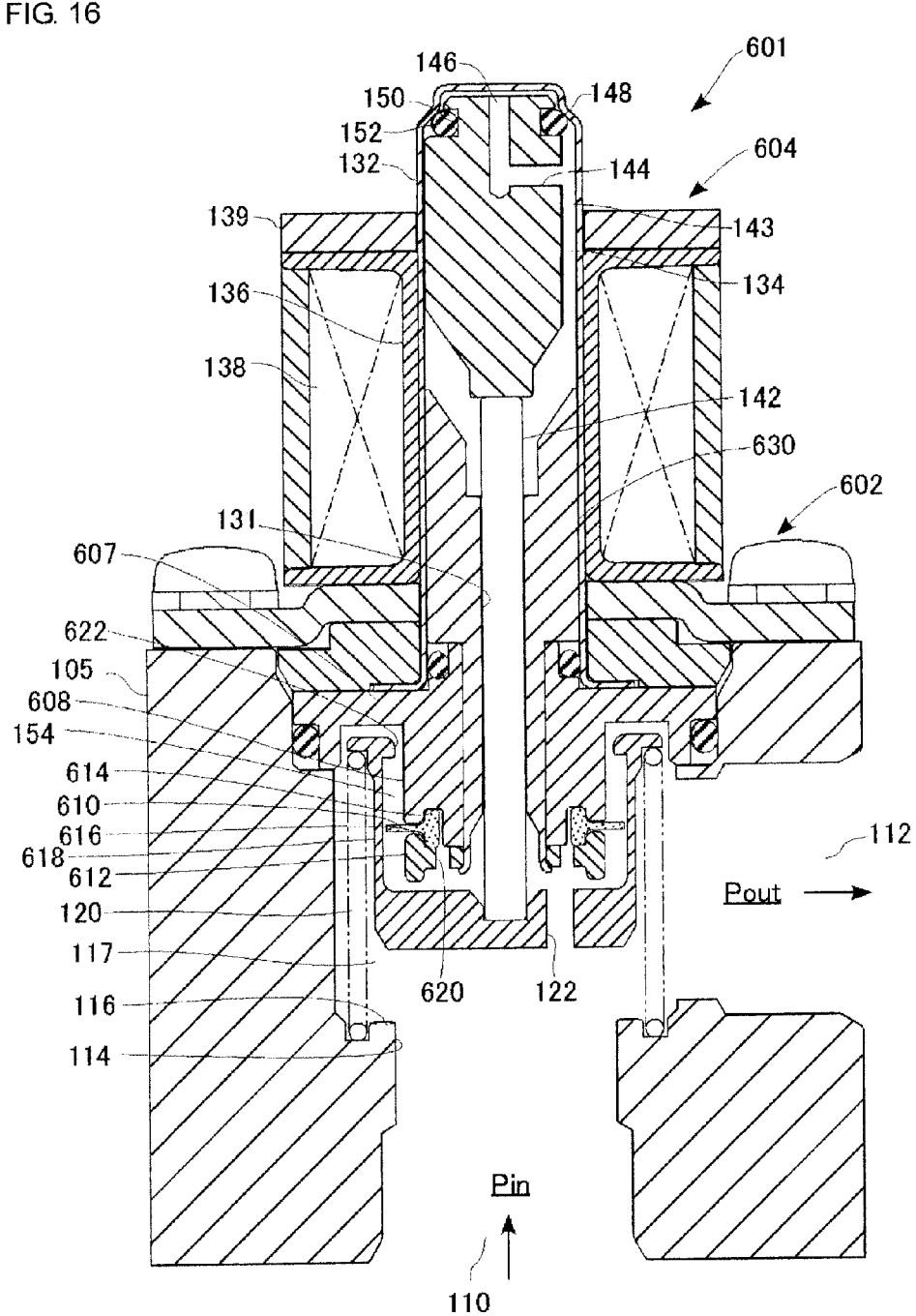
FIG. 16 is a cross-sectional view showing a concrete structure and operation of a control valve according to a sixth embodiment.
Figure 17:
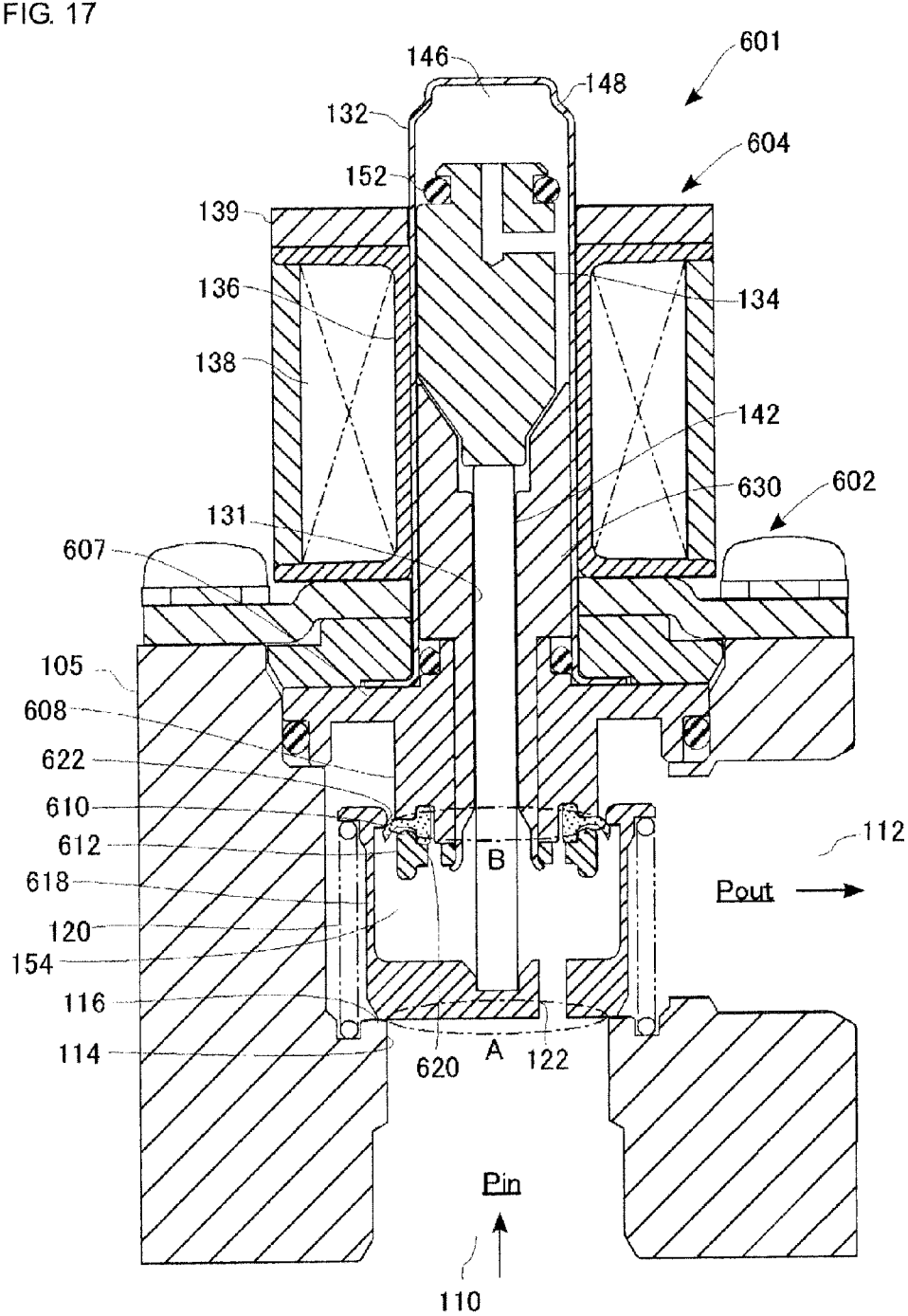
FIG. 17 is a cross-sectional view showing a concrete structure and operation of a control valve according to a sixth embodiment.

A control valve according to a sixth embodiment has a structure similar to that of the control valve according to the first embodiment except that the structures of a valve element and a guide member differ from those of the first embodiment. Thus, the structural components of the sixth embodiment approximately similar to those of the first embodiment are given the identical reference numerals and the description thereof is omitted. FIG. 16 and FIG. 17 are each a cross-sectional view showing the concrete structure and operations of a control valve according to the sixth embodiment.

As shown in FIG. 16, a control valve 601 is constituted by integrally assembling a valve unit 602 and a solenoid 604. A central part of a connection member 607, which closes the opening of the body 105, extends downward, namely, extends inside the body 105, and thereby constitutes a cylindrical partition 608. A lower half of the core 630 passes through the inside of the connection member 607. A support member 612 is assembled in such a manner as to hold a sealing member 610 between a lower end of the partition 608 and the support member 612. The sealing member 610, which is formed of an annular and filmy elastic body (e.g., rubber), is supported in a manner such that a thick-walled part of the sealing member 610 in an inner circumferential end thereof is held between the partition 608 and the support member 612. A thin-walled part of the sealing member 610 extends radially outward from each outer circumferential surface of the partition 608 and the support member 612.

A central part in the lower end of the partition 608 protrudes further downward from the periphery and has a circular boss shape. Also, a circular annular groove is formed on a boundary between the central part and the periphery. The support member 612 having a thick-walled part in its outer periphery is in a stepped ring shape. The support member 612 is assembled such that a central part of the top surface thereof abuts against a central part of the underside (lower end surface of a boss-shape part) of the partition 608, and the support member 612 is secured to the partition 608 such that the lower end of the core 630 is swaged outward.

In between the underside of the partition 608 and the top surface of the support member 612, a ring-shaped holding section 614 is formed in a position of the annular groove of the partition 608. And a slit-like insertion part 616 is formed in such a manner as to extend radially outward from the holding section 614. The thick-walled part of the sealing member 610 is held in the holding section 614, and the thin-walled part thereof is disposed in such a manner as to protrude radially outward through the insertion part 616. Provided in the support member 612 is a communicating hole 620 that penetrates vertically and communicates to and from the holding section 614.

The valve element is inserted around (outserted to) the partition 608. An engagement member 622 somewhat protruding radially inward is provided in an upper end opening of the valve element 618. The sealing member 610 touches and leaves the engagement member 622 at the outer periphery of the top surface of the sealing member 610 so that an upper end opening of the back pressure chamber 154 can be opened and closed.

In the core 630, a through-hole 131 is provided along the axis line of the core 630, so that the actuating rod 142 penetrates the through-hole 131. The core 630 and the partition 608 slidably support the actuating rod 142 and thereby functions as a guide member that guides the valve element 618 in the direction of axis line. The upper end of the actuating rod 142 abuts against the lower surface of the plunger 134, whereas the lower end of the actuating rod 142 is fitted to a recess provided in a bottom center of the valve element 618. In the present embodiment, the actuating rod 142 abuts against the valve element 618 but is not fixed thereto. That is, the actuating rod 142 is so disposed as to be interposed between the plunger 134 and the valve element 618 without being fixed thereto, so that the actuating rod 142 operates integrally with the plunger 134 and the valve element 618. In a modification, the lower end of the actuating rod 142 may be secured to the valve element 618 by the press-fitting and the like.

As shown in FIG. 17, a cross-sectional area A of the valve hole 114 and a cross-sectional area B are both set to a practically identical value so that the majority of effects of the pressure of the refrigerant acting on the valve element 618 can be canceled out. Here, the cross-sectional area B is determined such that when the sealing member 610 is seated on the engagement member 622, the effective pressure-receiving diameter is set as the diameter of the area B.

While the solenoid 604 is turned off as illustrated in FIG. 16, no suction power between the core 630 and the plunger 134 is in effect in the control valve 601 configured as described above. Thus, the valve element 618 is fully opened under the effect of the biasing force of the spring 120. On the other hand, while the solenoid 604 is turned on as illustrated in FIG. 17, the suction force is created between the core 630 and the plunger 134 and therefore the solenoidal force is conveyed to the valve element 618 by way of the actuating rod 142. As a result, the valve element 618 is driven in a valve closing direction.

Figure 18:
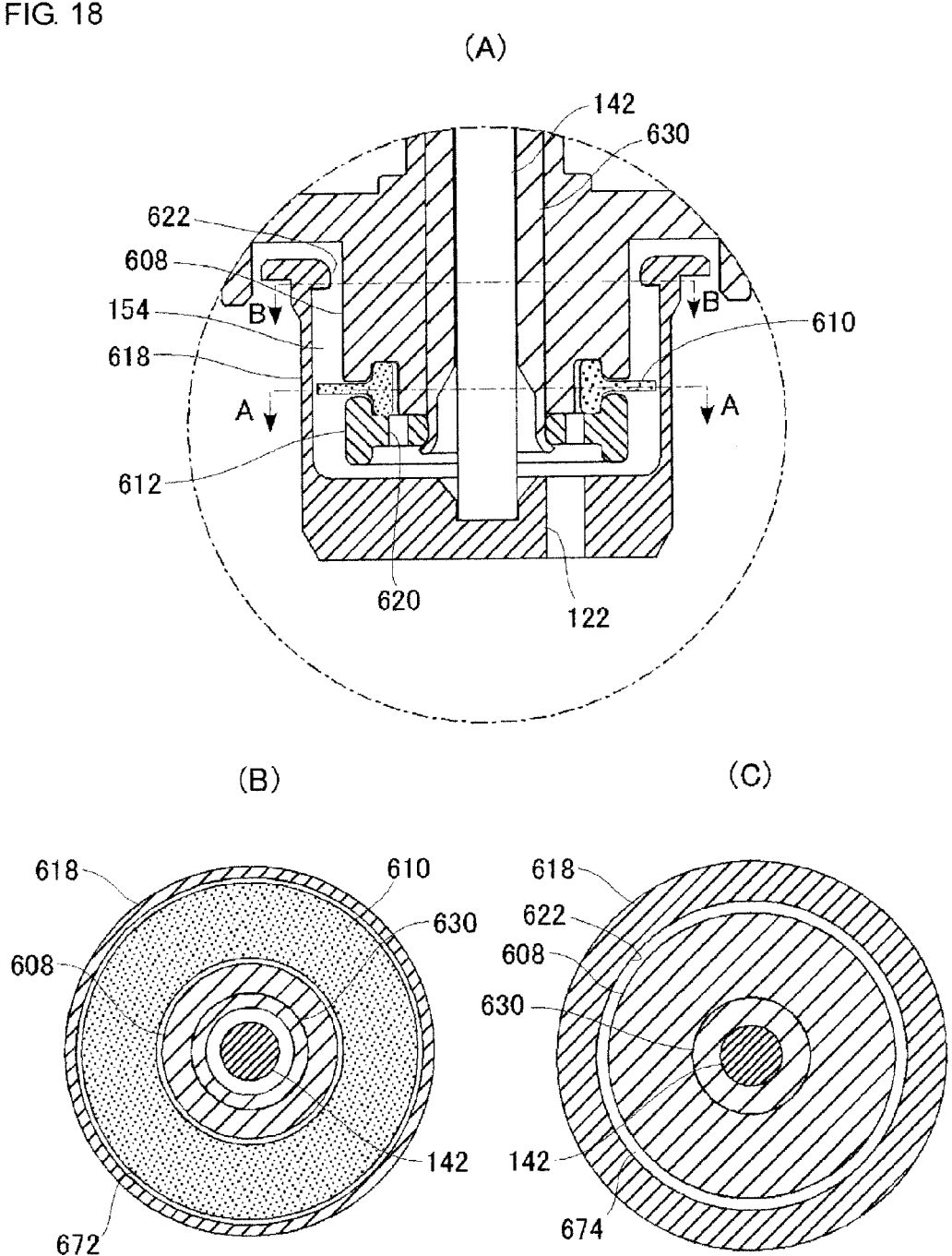
FIGS. 18A to 18C are each a partially enlarged sectional view showing structure and operation of components surrounding a valve element.
Figure 19:
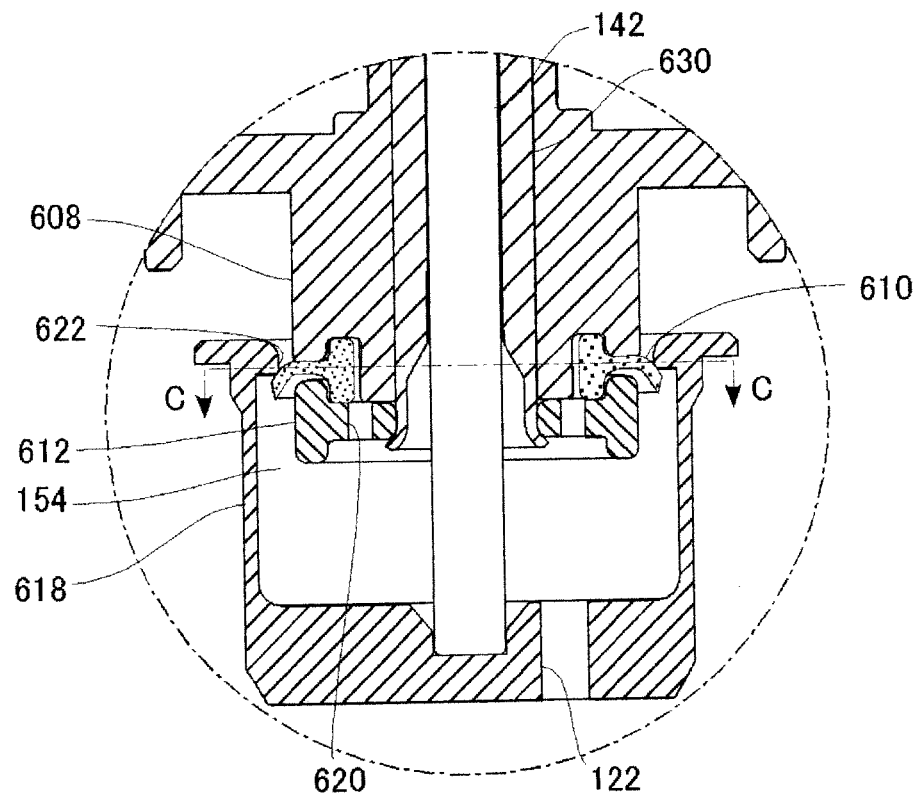
Figure 19:
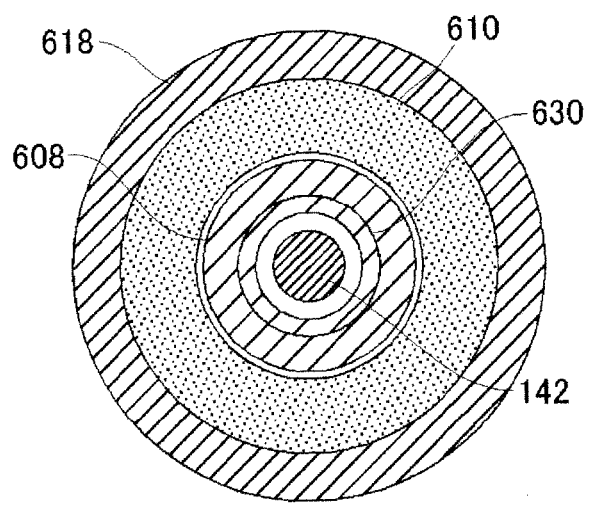

FIGS. 18A to 18C and FIGS. 19A and 19B are each a partially enlarged sectional view showing structure and operation of components surrounding a valve element. FIG. 18A is a partially enlarged sectional view of the components surrounding the valve element in a state where the solenoid is turned off. FIG. 18B is a cross-sectional view taken along the line A-A and viewed on the side shown by the arrows of FIG. 18A, and FIG. 18C is a cross-sectional view taken along the line B-B and viewed on the side shown by the arrows of FIG. 18A. FIG. 19A is a partially enlarged sectional view of the components surrounding the valve element in a state where the solenoid is turned on. FIG. 19B is a cross-sectional view taken along the line C-C and viewed on the side shown by the arrows of FIG. 19A.

In a valve fully-opened state where the solenoid 604 is turned off, the sealing member 610 gets separated away from the engagement member 622 as shown in FIGS. 18A to 18C. And a predetermined clearance 672 is formed between the outer periphery of the sealing member 610 and the inner periphery of the valve element 618. On the other hand, a clearance 674, which is larger than the clearance 672, is formed between the engagement member 622 and the partition 608. In other words, a top-end opening of the back pressure chamber 154 is opened. Besides, since there is no sliding portion in between the valve element 618 and the partition 608, a gap passage that allows the flow of the refrigerant is formed over the entire overlapped portion where the valve element 618 and the partition 608 overlap with each other. As a result, if the foreign material stays on between the valve element 618 and the partition 608, the discharge of foreign material can be promoted effectively.

In a valve-closed state where the solenoid 604 is turned on, the sealing member 610 seats on the engagement member 622 as shown in FIGS. 19A and 19B. In this valve-closed state, the sealing member 610 adheres tightly to the engagement member 622 as the periphery of the sealing 610 elastically deforms. Thus, the top-end opening of the back pressure chamber 154 is hermetically sealed and therefore the pressure of the back pressure chamber 154 is stably kept at the upstream-side pressure Pin. Also, since the sealing member 610 is elastically deformable as already mentioned, the assembly tolerance is absorbed. Thus, it is no longer necessary to strictly and stringently adjust the positional relation between the valve element 618 and the sealing member 610 during a valve closing period and therefore the control valve can be designed more freely.

Also, the aforementioned provision of the communicating hole 620 in the support member 612 allows maintaining the balance of the pressures acting on the sealing member 610 radially inward and radially outward, respectively, so that deformation of sealing member 610 in an inside-diameter direction can be prevented or suppressed. That is, the clearance between the sealing member 610 and the valve element 618 can be maintained as originally designed during a valve opening period as shown in FIGS. 18A to 18C. Also, the sealing member 610 is reliably seated on the engagement member 622 during a valve closed period as shown in FIGS. 19A and 19B, so that the sealing capability can be maintained.

Seventh Embodiment

Figure 20:
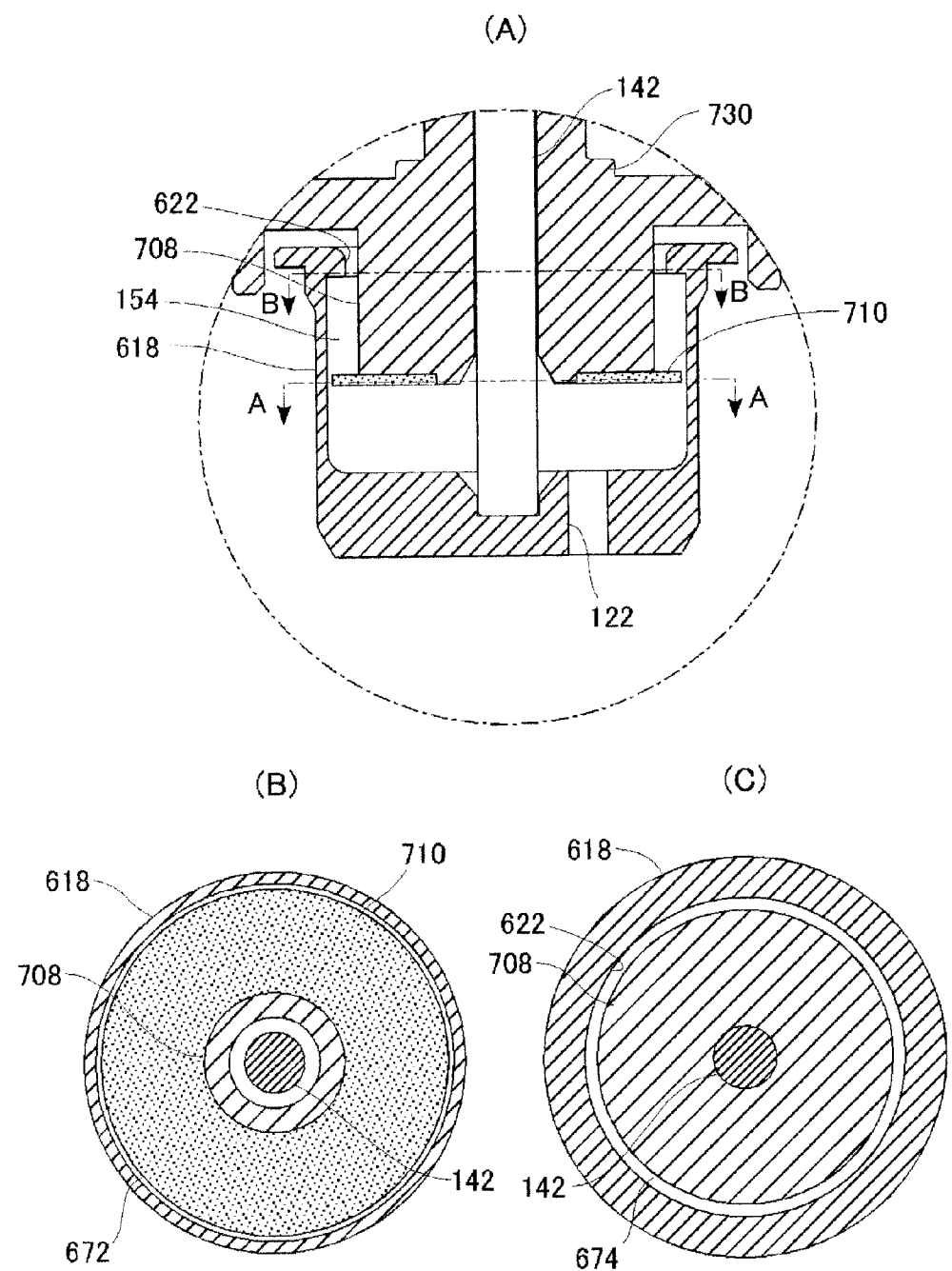
FIGS. 20A to 20C are each a partially enlarged sectional view showing structure and operation of components surrounding a valve element according to a seventh embodiment.
Figure 21:
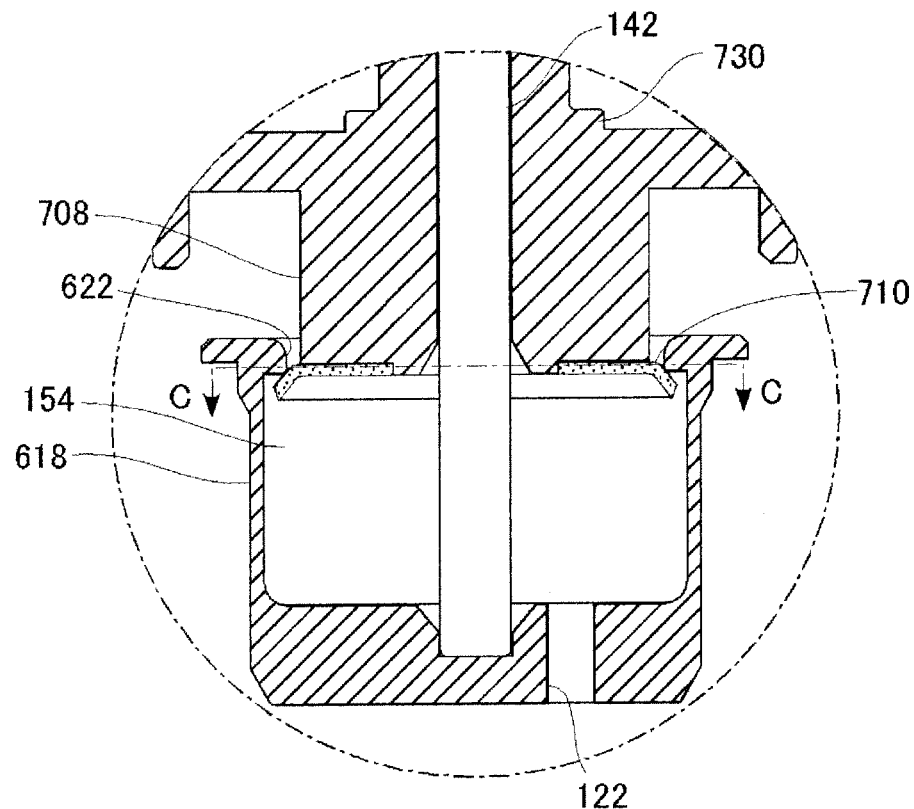
FIGS. 21A and 21B are each a partially enlarged sectional view showing structure and operation of components surrounding a valve element according to a seventh embodiment.
Figure 21:
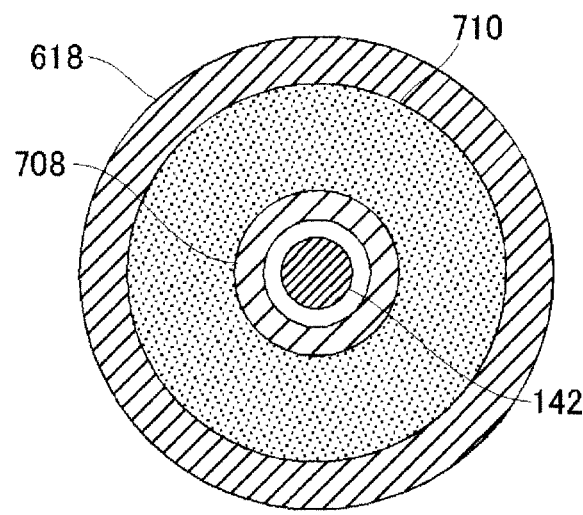

A control valve according to a seventh embodiment has a structure similar to that of the control valve according to the sixth embodiment except that the structures of a partition and a sealing member differ from those of the sixth embodiment. Thus, the structural components of the seventh embodiment approximately similar to those of the sixth embodiment are given the identical reference numerals and the description thereof is omitted. FIGS. 20A to 20C and FIGS. 21A and 21B are each a partially enlarged sectional view showing structure and operation of components surrounding a valve element according to the seventh embodiment. FIG. 20A is a partially enlarged sectional view of the components surrounding the valve element in a state where the solenoid is turned off. FIG. 20B is a cross-sectional view taken along the line A-A and viewed on the side shown by the arrows of FIG. 20A, and FIG. 20C is a cross-sectional view taken along the line B-B and viewed on the side shown by the arrows of FIG. 20A. FIG. 21A is a partially enlarged sectional view of the components surrounding the valve element in a state where the solenoid is turned on. FIG. 21B is a cross-sectional view taken along the line C-C and viewed on the side shown by the arrows of FIG. 21A.

In the present embodiment, a partition 708 (connection member) is formed integrally with a core 730. A sealing member 710 is mounted on an underside of the partition 708. The sealing member 710 is formed of a thin-film and ring-shaped elastic body (rubber packing), and the inner half part of the sealing member 710 is fixed by baking on the underside of the partition 708. By employing such a structure as described above, the similar functions to that of the sixth embodiment can be achieved by the seventh embodiment.

That is, in a valve fully-opened state where the solenoid is turned off, the clearance 672 is formed between the outer periphery of the sealing member 710 and the inner periphery of the valve element 618, as shown in FIGS. 20A to 20C. And the clearance 674, which is larger than the clearance 672, is formed between the engagement member 622 and the partition 708. Besides, a gap passage that allows the flow of the refrigerant is formed over the entire overlapped portion where the valve element 618 and the partition 708 overlap with each other. Thus, the refrigerant introduced from the communicating hole 122 passes through the gap passage provided between the valve element 618 and the partition 708 and is then discharged out of the back pressure chamber 154. As a result, if the foreign material stays on between the valve element 618 and the partition 708, the discharge of foreign material is promoted. In a valve-closed state, on the other hand, where the solenoid is turned on, the sealing member 710 seats on the engagement member 622 as shown in FIGS. 21A and 21B. In this valve-closed state, the sealing member 710 adheres tightly to the engagement member 622 as the periphery of the sealing 710 elastically deforms. Thus, the top-end opening of the back pressure chamber 154 is hermetically sealed.

Eighth Embodiment

Figure 22:
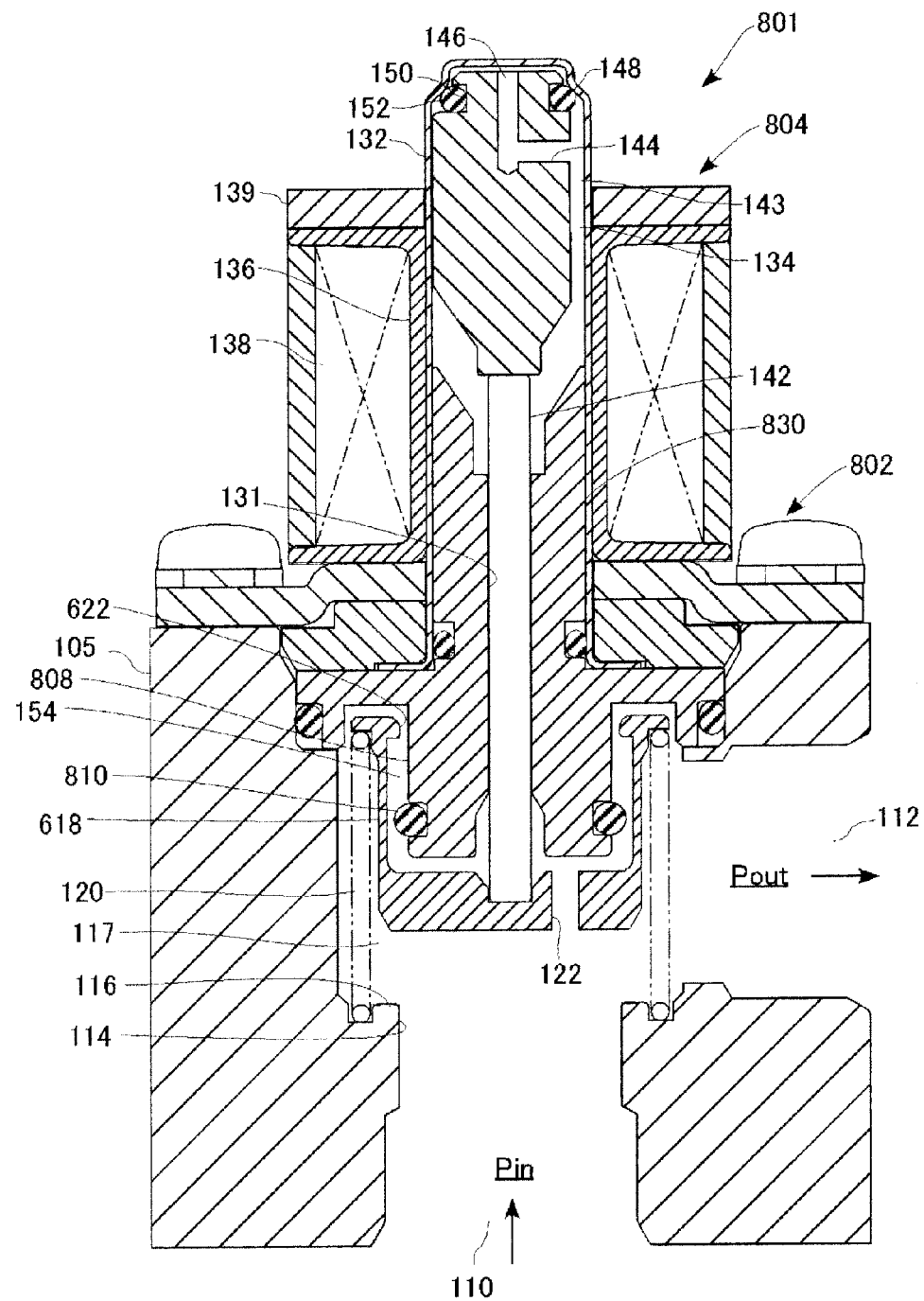
FIG. 22 is a cross-sectional view showing a concrete structure and operation of a control valve according to an eighth embodiment.
Figure 23:
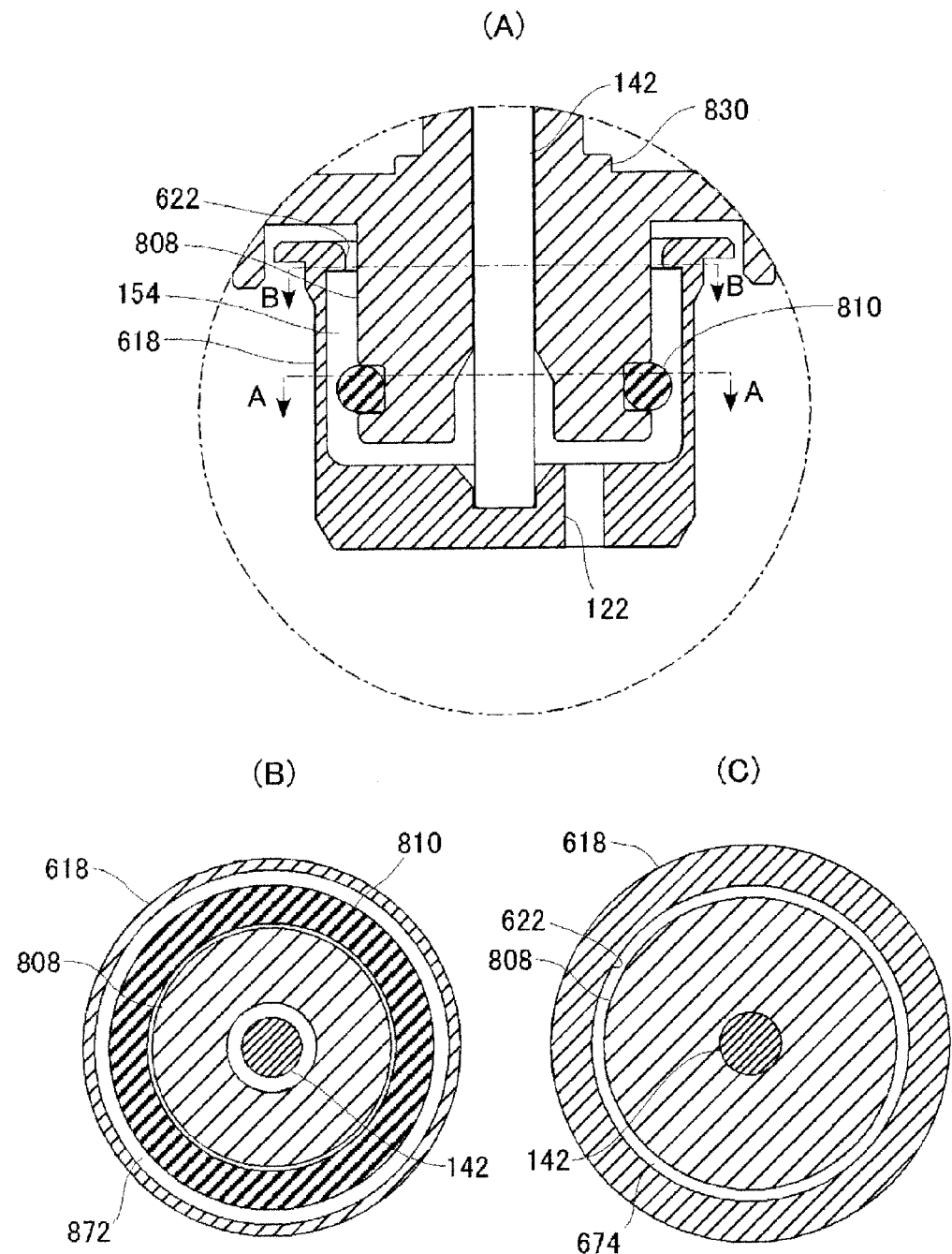
FIGS. 23A to 23C are each a partially enlarged sectional view showing structure and operation of components surrounding a valve element according to an eighth embodiment.
Figure 24:
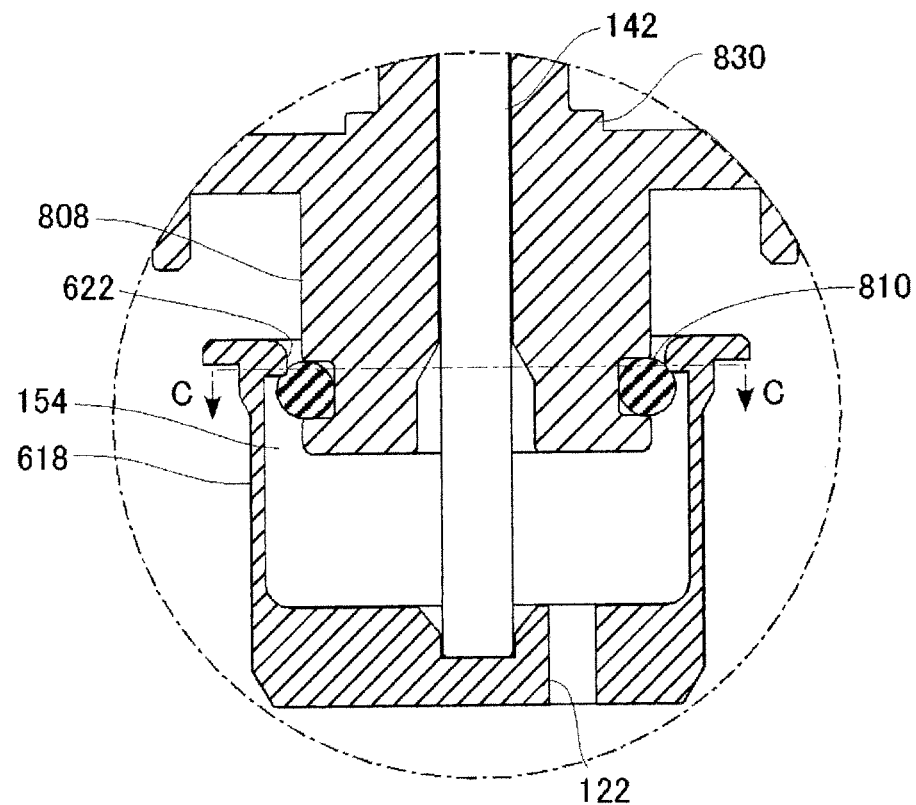
FIGS. 24A and 24B are each a partially enlarged sectional view showing structure and operation of components surrounding a valve element according to an eight embodiment.
Figure 24:
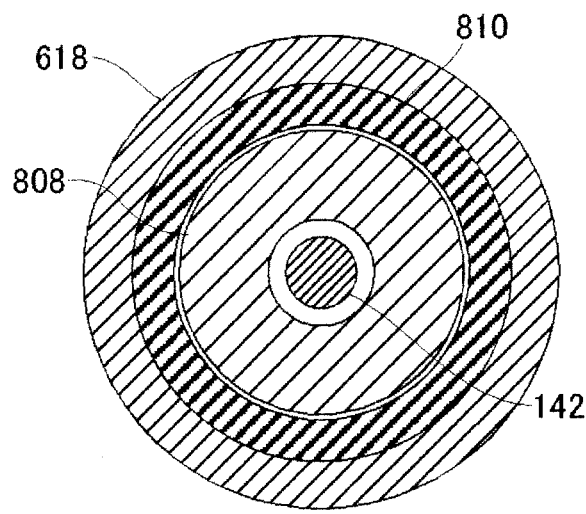

A control valve according to an eighth embodiment has a structure similar to that of the control valve according to the sixth embodiment except that the structures of a partition and a sealing member differ from those of the sixth embodiment. Thus, the structural components of the eighth embodiment approximately similar to those of the sixth embodiment are given the identical reference numerals and the description thereof is omitted. FIG. 22 is a cross-sectional view showing the concrete structure and operations of a control valve according to the eighth embodiment. FIGS. 23A to 23C and FIGS. 24A and 24B are each a partially enlarged sectional view showing structure and operation of components surrounding a valve element according to the eighth embodiment. FIG. 23A is a partially enlarged sectional view of the components surrounding the valve element in a state where the solenoid is turned off. FIG. 23B is a cross-sectional view taken along the line A-A and viewed on the side shown by the arrows of FIG. 23A, and FIG. 23C is a cross-sectional view taken along the line B-B and viewed on the side shown by the arrows of FIG. 23A. FIG. 24A is a partially enlarged sectional view of the components surrounding the valve element in a state where the solenoid is turned on. FIG. 24B is a cross-sectional view taken along the line C-C and viewed on the side shown by the arrows of FIG. 24A.

A control valve 801 is constituted by integrally assembling a valve unit 802 and a solenoid 804. Similar to the seventh embodiment, a partition 808 is formed integrally with a core 830. A sealing member 810, which is formed by an O-ring, is fitted on the outer periphery of a lower end of the partition 808. By employing such a structure as described above, the similar functions to that of the sixth embodiment can be achieved by the eighth embodiment.

That is, in a valve fully-opened state where the solenoid is turned off, a clearance 872 is formed between the outer periphery of the sealing member 810 and the inner periphery of the valve element 618, as shown in FIGS. 23A to 23C. And the clearance 674, which is larger than the clearance 872, is formed between the engagement member 622 and the partition 808. Besides, a gap passage that allows the flow of the refrigerant is formed over the entire overlapped portion where the valve element 618 and the partition 808 overlap with each other. Thus, the refrigerant introduced from the communicating hole 122 passes through the gap passage provided between the valve element 618 and the partition 808 and is then discharged out of the back pressure chamber 154. As a result, if the foreign material stays on between the valve element 618 and the partition 808, the discharge of foreign material is promoted. In a valve-closed state, on the other hand, where the solenoid is turned on, the sealing member 810 seats on the engagement member 622 as shown in FIGS.

24A and 24B. In this valve-closed state, the sealing member 810 adheres tightly to the engagement member 622 as the periphery of the sealing 810 elastically deforms. Thus, the top-end opening of the back pressure chamber 154 is hermetically sealed.

In the present embodiment, the sealing member 810 is comprised of the O-ring. Thus, it is only necessary that when the sealing member 810 is to be mounted on the partition 808, the O-ring be fitted into the lower end of the partition 808 with just a single operation. Hence, the manufacturing cost can be reduced. Note that the O-ring is not as flexible as the packing is because the O-ring has a certain thickness. Accordingly, in order to provide increased design freedom, the six or seventh embodiment may be preferable where a thin-film sealing member is used.

Ninth Embodiment

Figure 25:
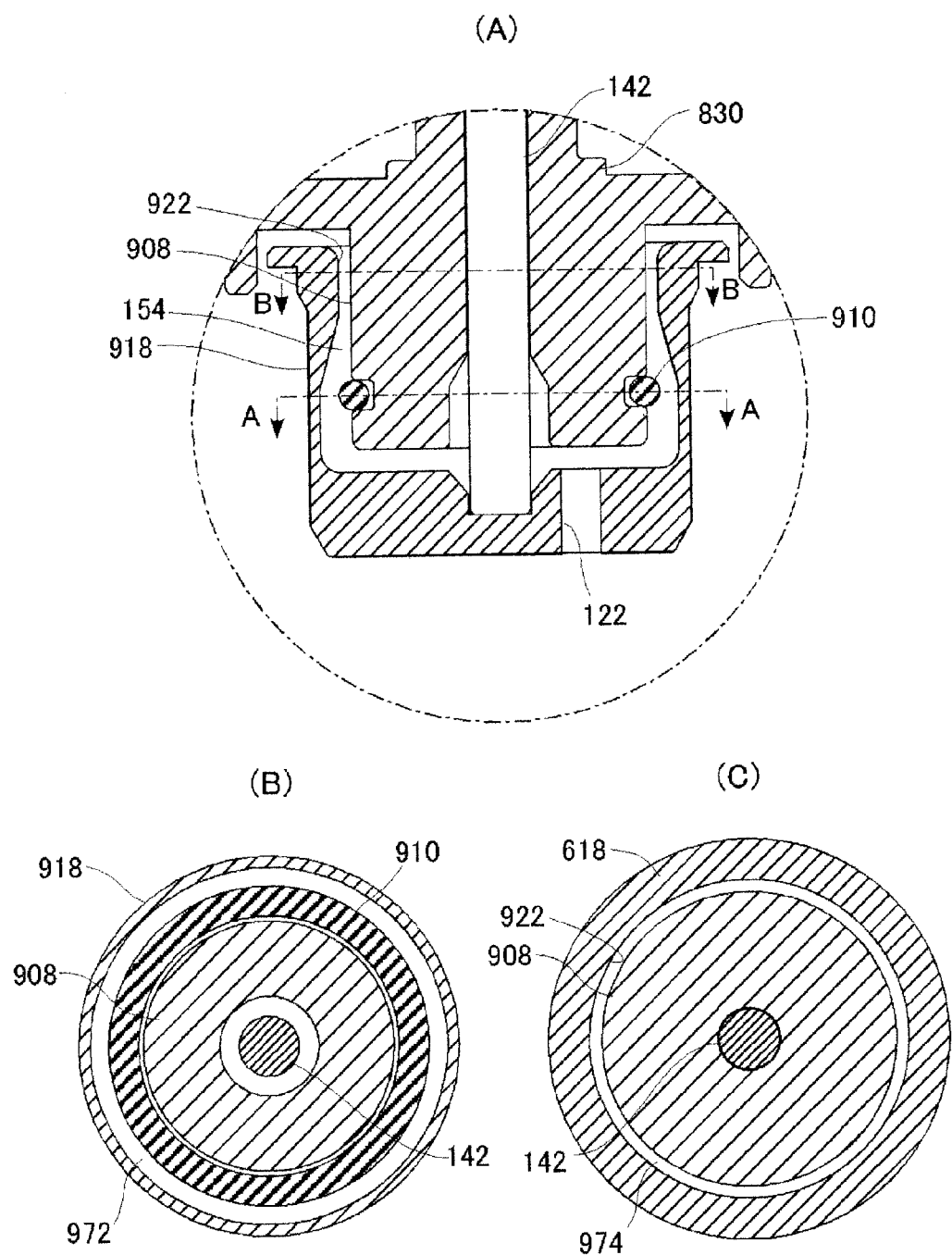
FIGS. 25A to 25C are each a partially enlarged sectional view showing structure and operation of components surrounding a valve element according to a ninth embodiment.
Figure 26:
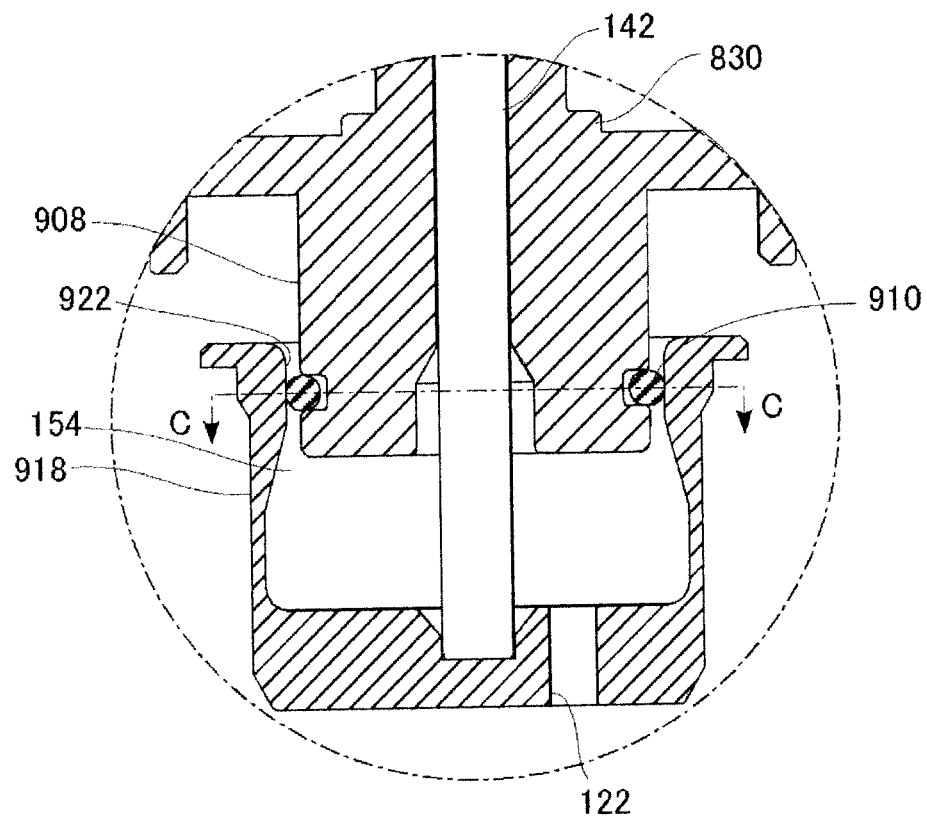
FIGS. 26A and 26B are each a partially enlarged sectional view showing structure and operation of components surrounding a valve element according to a ninth embodiment.
Figure 26:
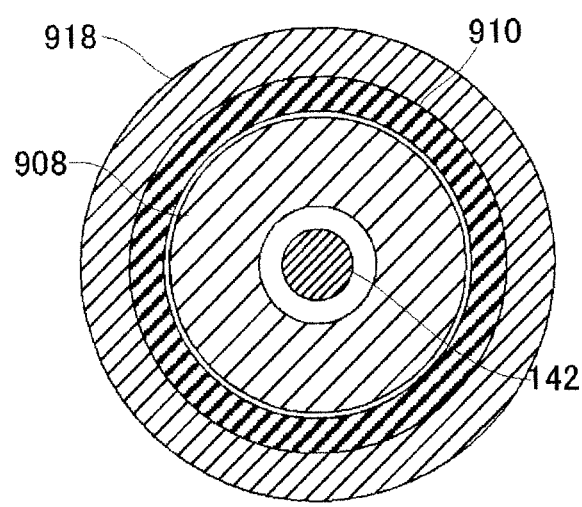

A control valve according to a ninth embodiment has a structure similar to that of the control valve according to the eighth embodiment except that the structures of a partition and a sealing member differ from those of the eighth embodiment. FIGS. 25A to 25C and FIGS. 26A and 26B are each a partially enlarged sectional view showing structure and operation of components surrounding a valve element according to the ninth embodiment. FIG. 25A is a partially enlarged sectional view of the components surrounding the valve element in a state where the solenoid is turned off. FIG. 25B is a cross-sectional view taken along the line A-A and viewed on the side shown by the arrows of FIG. 25A, and FIG. 25C is a cross-sectional view taken along the line B-B and viewed on the side shown by the arrows of FIG. 25A. FIG. 26A is a partially enlarged sectional view of the components surrounding the valve element in a state where the solenoid is turned on. FIG. 26B is a cross-sectional view taken along the line C-C and viewed on the side shown by the arrows of FIG. 26A.

In the present embodiment, a sealing member 910 fitted on a lower end of a partition 908 is inserted to and removed from an engagement member 922 of a valve element 918. In other words, while the engagement member 922 is formed larger in the direction of axis line than the engagement member 622 according to the eighth embodiment, the sealing member 910 is comprised of an O-ring that is smaller in size than that of the sealing member 810 according to the eighth embodiment. By employing such a structure as described above, too, the similar functions to that of the eighth embodiment can be achieved by the ninth embodiment.

That is, in a valve fully-opened state where the solenoid is turned off, a clearance 972 is formed between the outer periphery of the sealing member 910 and the inner periphery of the valve element 918, as shown in FIGS. 25A to 25C. And a clearance 974, which is larger than the clearance 972, is formed between the engagement member 922 and the partition 908. Besides, a gap passage that allows the flow of the refrigerant is formed over the entire overlapped portion where the valve element 918 and the partition 908 overlap with each other. Thus, the refrigerant introduced from the communicating hole 122 passes through the gap passage provided between the valve element 918 and the partition 908 and is then discharged out of the back pressure chamber 154. As a result, if the foreign material stays on between the valve element 918 and the partition 908, the discharge of foreign material is promoted. In a valve-closed state, on the other hand, where the solenoid is turned on, the sealing member 910 seats on the engagement member 922 as shown in FIGS. 26A and 26B. In this valve-closed state, the sealing member 910 slides along the engagement member 922, so that the top-end opening of the back pressure chamber 154 is hermetically sealed.

In the present embodiment, the sealing member 910 is comprised of the O-ring, and the structure of the control valve according to the ninth embodiment is configured such that the sealing member 910 is inserted to and removed from the engagement member 922. As a result, the sliding member 910 can have a sufficient sliding range and therefore the design freedom can be improved as with the sixth and seventh embodiments. Note that since the O-ring has a high sealing property, the resultant sliding friction is also large. Thus, a larger drive force than that required in the sixth and seventh embodiments is required when the valve element 918 is opened and closed.

Tenth Embodiment

Figure 27:
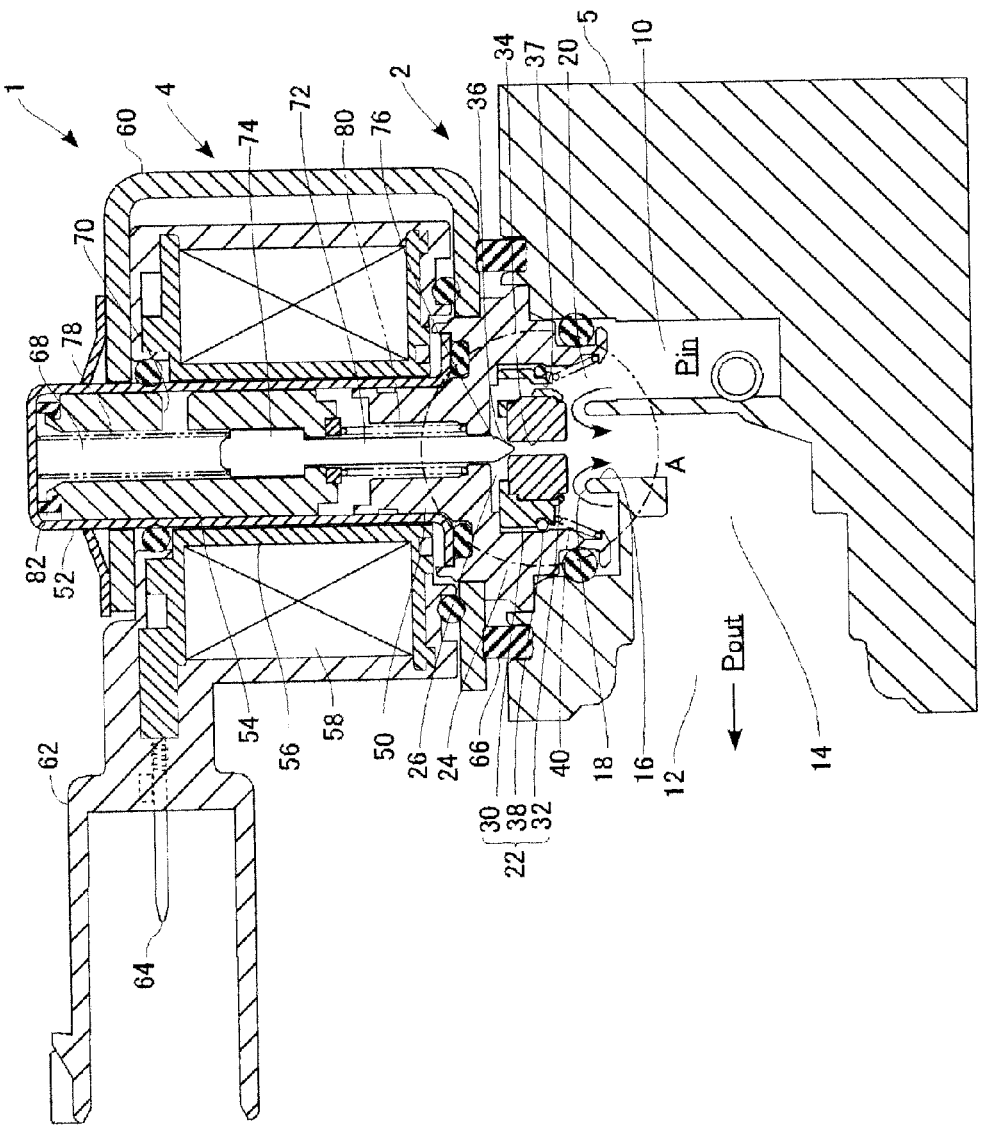
FIG. 27 is a cross-sectional view showing a concrete structure and operation of a control valve according to a tenth embodiment.
Figure 28:
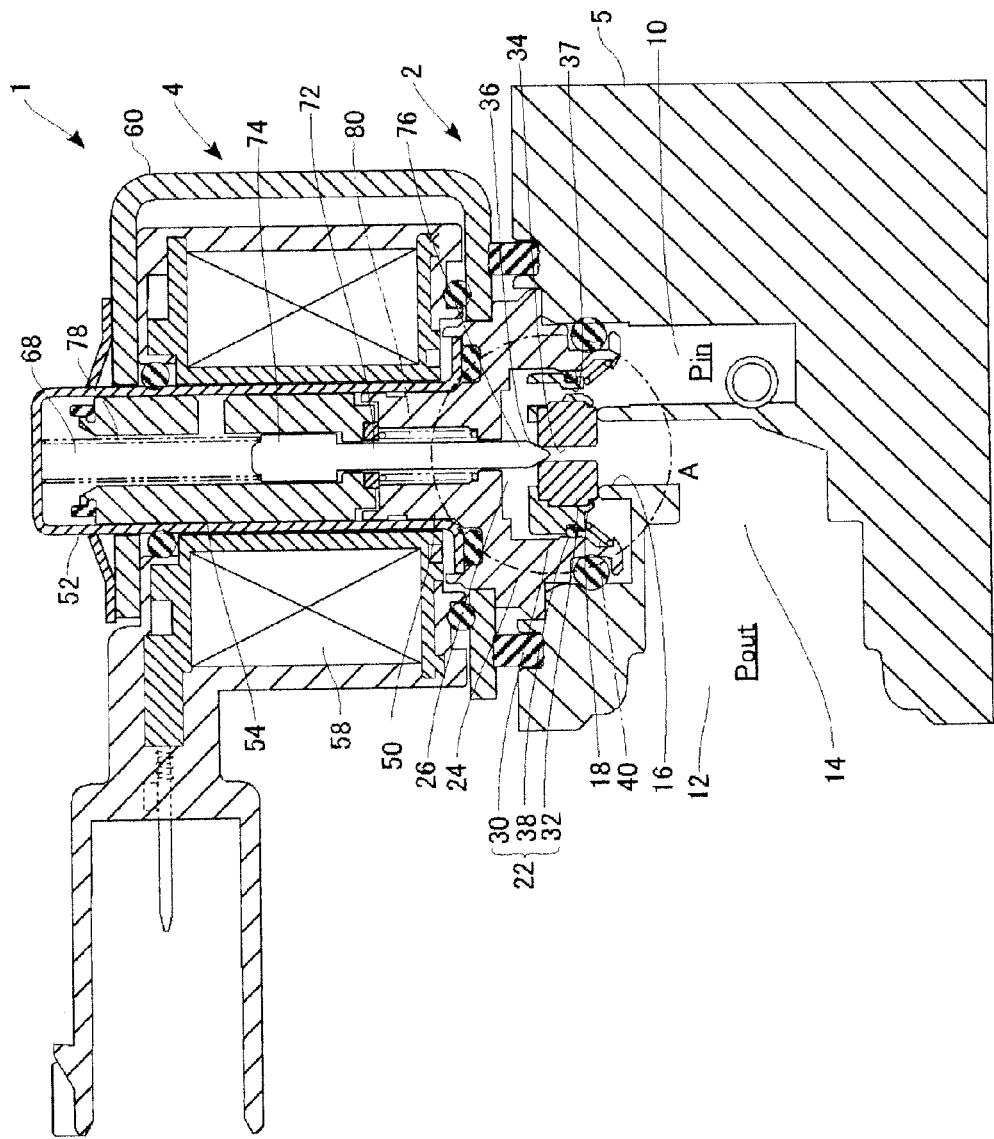
FIG. 28 is a cross-sectional view showing a concrete structure and operation of a control valve according to a tenth embodiment.

A control valve according to a tenth embodiment is configured as a so-called pilot operated electromagnetic valve. FIG. 27 and FIG. 28 are each a cross-sectional view showing a concrete structure and operation of a control valve according to the tenth embodiment. As shown in FIG. 27, a control valve 1 is constituted by integrally assembling a valve unit 2 and a solenoid 4. The control valve 1 according to the present embodiment is assembled into a not-shown expansion valve (thermostatic expansion valve) and functions as a shutoff valve that permits or shuts off the flow of refrigerant at a downstream side of a valve section of the expansion valve. The control valve 1 is provided with a body 5 common used with the expansion valve.

Formed in the body 5 are a lead-in passage 10 leading to a not-shown lead-in port, and a lead-out passage 14 leading to a lead-out port 12. A valve hole 16 is provided in between the lead-in passage 10 and the lead-out passage 14, and a valve seat 18 is formed in an opening end located upstream of the vale hole 16. A valve element 22 of a stepped cylindrical shape is disposed in a pressure chamber surrounded by the body 5 and the solenoid 4, namely in a pressure chamber 20 located upstream of the valve hole 16. A main valve is opened and closed with the valve element 22 touching and leaving the valve seat 18. Also, a guide member 24 of a stepped cylindrical shape, which functions as a "partition", extends from a solenoid 4 side toward a pressure chamber 20, and the valve element 22 is inserted into the guide member 24. The valve element 22 and the guide member 24 are disposed coaxially with the valve hole 16 (i.e., extend along the same axis line). The valve element 22 divides a back pressure chamber 26 in between the valve element 22 and the guide member 24.

The valve element 22 is one in which a cylindrical elastic body 32 (e.g., polytetrafluoroethylene (PTFE) or rubber) is secured inside a cylindrical body 30. The elastic body 32 is seated on the valve seat 18, thereby improving the sealing property of the main valve. A pilot valve hole 34 runs through the elastic body 32 along the axis line of the elastic body 32. A pilot valve seat 36 is formed at an end of the pilot valve hole 34 on a back pressure chamber 26 side. A smaller diameter orifice 37, which communicates to and from the back pressure chamber 26 and which also functions as a "leak passage", is formed near the periphery of the body 30. Also, a recessed groove is formed on an outer circumferential surface of the body 30, and an O-ring 38, which functions as a "sealing member", is fitted on the recessed groove. The valve element 22 is so configured as to be slidable relative to a part of the guide member 24 on the O-ring 38. The valve element 22 is guided by the guide member 24 and, at the same time, stably supported thereby. Set between a tip of the guide member 24 and the valve element 22 is a spring 40 that biases the valve element 22 in a valve opening direction and that also functions as a "biasing member".

The solenoid 4 is so mounted as to close the opening of the pressure chamber 20. The solenoid 4 includes a core 50 formed integrally with the guide member 24, a sleeve 52 secured to the core 50, a plunger 54 disposed within the sleeve 52 in a position opposite to the core 50, a bobbin 56 inserted around (outserted to) the sleeve 52 and fitted thereto, and an electromagnetic coil 58 wound around the bobbin 56. The plunger 54 is disposed opposite to the valve element 22 relative to the core 50, namely, disposed at a bottom side of the sleeve 52. A resin mold is so applied to the electromagnetic coil 58 as to cover it from outside, and a casing 60 is so provided as to further cover this molded portion from outside. The casing 60 also functions as a yoke that constitutes a magnetic circuit. One end of a part of the molded portion extends outside the casing 60 so as to form a connector 62. A connection terminal 64 of the connector 62 connects to the electromagnetic coil 58. The casing 60 is coupled to the body 5 via a seal ring 66.

The core 50 is of a stepped cylindrical shape. The diameter of a lower half of the core 50 is expanded and is formed connectedly on the guide member 24. The plunger 54 is of a stepped cylindrical shape, and a back pressure chamber 68 is formed in a position opposite to the core 50. The back pressure chamber 68 communicates with the back pressure chamber 26 through a communicating path 70 provided at a plunger 54 side, a communicating groove (not shown) formed on the outer periphery of the plunger 54, a space between the core 50 and the plunger 54, and a clearance between the core 50 and the actuating rod 72. Thus, when the control valve 1 is in a mode in which it is controlled as shown in FIG. 28, both the back pressure chamber 26 and the back pressure chamber 68 are filled with the fluid having an upstream-side pressure Pin.

The actuating rod 72 is coaxially inserted inside the core 50 and the plunger 54. The actuating rod 72 has an engagement member 74, having an slightly expanded diameter, which is disposed at an upper end part of the actuating rod 72, and a lower end part of the actuating rod 72 is a tapered pilot valve element 76. The pilot valve element 76, which extends to the back pressure chamber 26, opens and closes a pilot valve by touching and leaving the pilot valve seat 36. Set between a bottom of the sleeve 52 and the engagement member 74 is a spring 78 (functioning as a "biasing member") that biases the pilot valve element 76 in a valve closing direction. Also, set between the plunger 54 and the core 50 is a spring 80 (functioning as a "biasing member") that biases the plunger 54 in such a direction as to separate the plunger 54 away from the core 50. In the present embodiment, the spring load of the spring 80 is set larger than that of the spring 78.

By employing such a structure as described above, the pilot valve element 76 basically operates integrally with the plunger 54. And when the pilot valve element 76 is seated on the pilot seat 36, the pilot valve element 76 is displaceable relative to the plunger 54. As a result, the suction power does not directly exert on the pilot valve element 76. That is, the pilot valve can be closed by only the biasing force of the spring 78 and therefore the damage to the pilot valve seat 36, such as deformation or collapse thereof, can be minimized A ring-shaped elastic body 82 (e.g., rubber) is fitted on the top end part of the plunger 54. This can suppress the hitting sound that may occur when the plunger 54 hits the sleeve 52 with the solenoid 4 turned off.

As the solenoid 4 is turned on (electrically conducting) as illustrated in FIG. 28, the suction force is created between the core 50 and the plunger 54 in the control valve 1 configured as described above and therefore the actuating rod 72 is displaceable, by the biasing force of the spring 78, in a valve closing direction. As result, the pilot valve element 76 is seated on the pilot seat 36, thereby closing the pilot valve. At this time, the refrigerant in the lead-in passage 10 is introduced into the back pressure chamber 26 through the orifice 37. This causes the pressure difference in a valve closing direction to greatly affect the valve element 22, which in turn closes the main valve resisting the biasing force of the spring 40. While the solenoid 4 is being kept on, the both main valve and the pilot valve maintain their closed states and therefore the pressure within the back pressure chamber 26 is maintained. As a result, the closed state of the main valve is also stably maintained.

As the on/off state of the solenoid 4 is switched from on to off (nonconducting state), the suction power is no longer present between the core 50 and the plunger 54. Thus the pilot valve 76 is lifted up and gets separated away from the pilot valve seat 36, and the pilot valve is in an open state. As a result, the refrigerant within the back pressure chamber 26 is led out to a downstream side via the pilot valve hole 34 and therefore the pressure within the back pressure chamber 26 drops. Since the passage cross-section of the orifice 37 is smaller than that of the pilot valve hole 34, a pressure difference is caused and temporarily acts on the valve element 22 in a valve opening direction. The valve element 22 is upthrusted by the force due to the pressure difference and the biasing force of the spring 40, which in turns opens the main valve at once.

Figure 29:
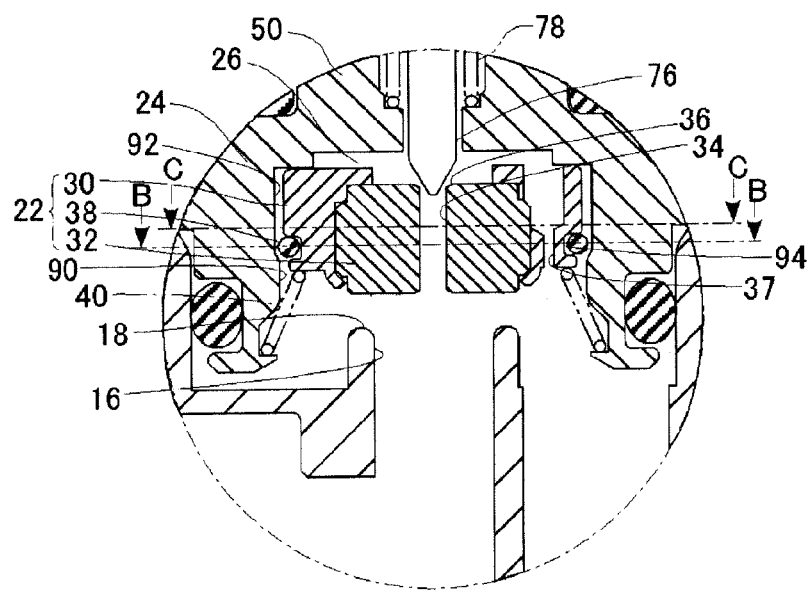
FIGS. 29A to 29C are each a partially enlarged sectional view showing structure and operation of components surrounding a valve element.
Figure 29:
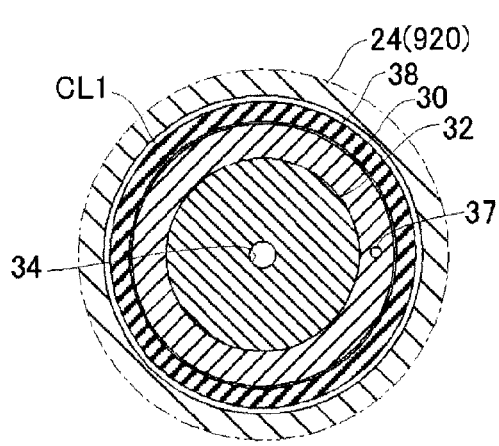
Figure 29:
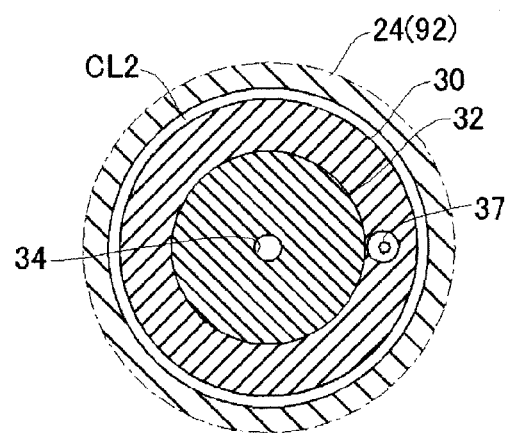
Figure 30:
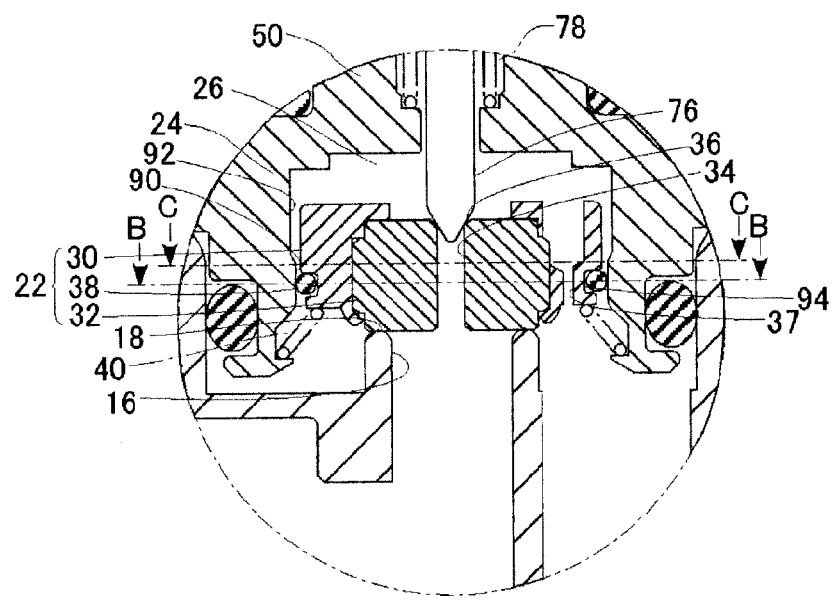
FIGS. 30A to 30c are each a partially enlarged sectional view showing structure and operation of components surrounding a valve element.
Figure 30:
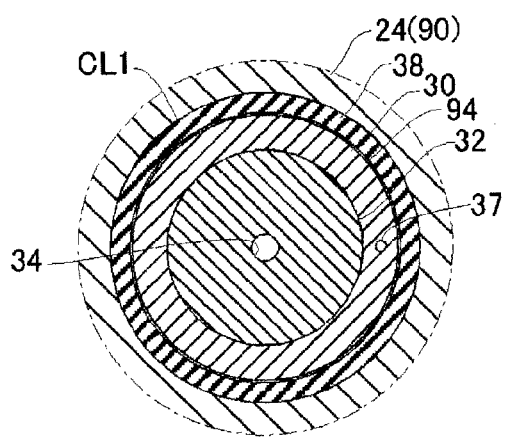
Figure 30:
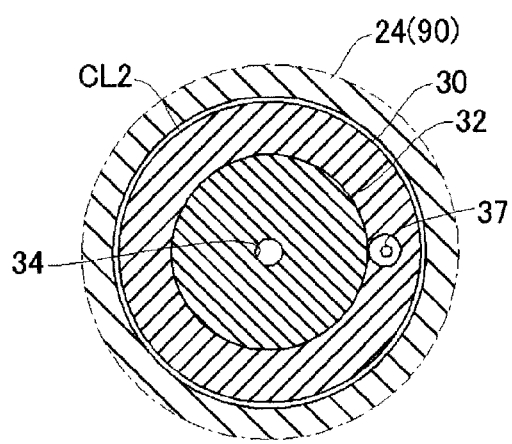

A detailed description is now given of structures and operations of major components in the present embodiment. FIGS. 29A to 29C and FIGS. 30A and 30B are each a partially enlarged sectional view showing structure and operation of a sliding portion of a valve element. FIG. 29A is an enlarge view of A in FIG. 27 and shows a state wherein the solenoid 4 is turned off. FIG. 29B is a cross-sectional view taken along the line B-B and viewed on the side shown by the arrows of FIG. 29A, and FIG. 29C is a cross-sectional view taken along the line C-C and viewed on the side shown by the arrows of FIG. 29A. FIG. 30A is an enlarge view of A in FIG. 28 and shows a state wherein the solenoid 4 is turned on. FIG. 30B is a cross-sectional view taken along the line B-B and viewed on the side shown by the arrows of FIG. 30A, and FIG. 30C is a cross-sectional view taken along the line C-C and viewed on the side shown by the arrows of FIG. 30A.

As shown in FIGS. 29A and 30A, the guide member 24 has a small-diameter part 90 (functioning as an "engagement member") near the valve hole 16. Here, the smaller-diameter part 90 is of a circular shape in cross section. Also, the guide member 24 has a larger-diameter part 92, which is also of a circular shape in cross section, in a position separated away from the valve hole 16. Note that the inside diameter of the smaller-diameter part 90 is set practically identical to the outside diameter of the O-ring 38. By employing such a structure as described above, the minimum clearance in the overlapped portion where the valve element 22 and the guide member 24 overlap radially with each other is formed in the position where the O-ring 38 is disposed.

As illustrated in 29A and 30A, a space is formed between an underside of a recessed groove 94, where the O-ring 38 fits in, and the O-ring 38. Thus, even though the O-ring 38 is compressed axially by the pressure difference between an upstream side and a downstream side of a valve section and thereby becomes larger in size radially inward, the O-ring 38 is less likely to be subjected to the reaction force from the bottom surface of the recessed groove 94. This structure prevents the sliding friction between the O-ring 38 and the smaller-diameter part 90 from becoming excessively large, so that the smooth operation of the valve element 22 is maintained.

In the structure as described above, while the main vale is being closed as shown in FIG. 30A, the O-ring 38 is disposed counter to the smaller-diameter part 90. Accordingly, as shown in FIG. 30B, the minimum clearance CL1 is zero (local minima) As shown in FIG. 30C, the clearance CL2 is also smaller in the position where the body 30 is disposed. Although, as mentioned already, a microscopic spacing is formed between the bottom surface of the recessed groove 94 and the O-ring 38, the O-ring 38 is pressed against a side surface of the recessed groove 94 and the spacing is hermetically sealed in a process where the main valve is closed. Thus such a sealed state is maintained during a valve closing period. As a result, the leakage of the fluid through the spacing between the O-ring 38 and the recessed groove 94 is prevented, so that the stable valve opening status can be maintained.

On the other hand, while the main vale is being open as shown in FIG. 29A, the O-ring 38 is disposed counter to the larger-diameter part 92. Accordingly, as shown in FIG. 29B, the minimum clearance CL1 is larger than that during a valve closing period. As shown in FIG. 29C, the clearance CL2 is larger all along the direction of axis line in the position where the body 30 is disposed. As a result, if the foreign material stays on between the valve element 22 and the guide member 24 during a valve closing period, the discharge of foreign material can be promoted during a valve opening period.

If, for example, an expansion valve into which the control valve 1 is assembled is installed is in a refrigeration cycle, a vacuum drawing process will be performed to fill the refrigeration cycle with the refrigerant when the expansion valve is first installed, and then it will be expected that flowback occurs in the control valve 1. In such a case, the magnitude relation in pressure is reversed. Thus, a high-pressure refrigerant is led to the back pressure chamber 26 via the pilot valve element 34. However, once the main valve is opened, a larger clearance between the valve element 22 and the guide member 24 is maintained and therefore it is less likely to occur that there will be an enough pressure difference to cause the valve element 22 to be closed. That is, prevented is such an event as one where the main valve is closed when the refrigerant is to be filled into the refrigeration cycle and therefore it becomes difficult to do so. In other words, even though the control valve 1 is provided as the shutoff valve, the refrigerant can be smoothly filled into the refrigeration cycle.

The description of the present invention given above is based upon illustrative embodiments. These embodiments are intended to be illustrative only and it will be obvious to those skilled in the art that various modifications could be further developed within the technical idea underlying the present invention and that such additional modifications are also within the scope of the present invention.

In the above-described embodiments, the portions where the valve element and the guide member have circular shapes complementary to their abutting surfaces, for example, but they may be configured in polygonal shapes, instead.

In the above-described embodiments, a description has been given of an example where the above-described control valves are provided downstream of the indoor evaporator and the outdoor evaporator, respectively. However, the control valve may be provided downstream of only one of the evaporators, instead. For example, the arrangement may be such that the control valve is provided downstream of the indoor evaporator and no control valve is provided downstream of the outdoor heat exchanger (if it operates as the outdoor evaporator).

In the above-described embodiments, a description has been given of an example where the control valve is configured as an evaporation pressure control valve that controls the evaporation pressure of the refrigerant in the evaporator. However, this should not be considered as limiting and, for example, the control valve may be configured as other open/close valves that open and close according as the control valve is electrically conducted or not.

In the above-described embodiments, a description has been given of an example where the control valve is configured as an electromagnetic valve provided with an actuator for electrically regulating the opening degree of the valve section from the outside. Instead, the control valve may be configured as other electrically driven valves, such as a motor-operated valve provided with a motor that functions as an actuator, for instance. Also, a description has been given of an example where the control valve is applied to an air conditioner of an electric-powered vehicle but it goes without saying that the control valve according to the preferred embodiments can be applied to an air conditioner of a vehicle provided with an internal-combustion engine and an air conditioner of a hybrid vehicle equipped with both an internal-combustion engine and an electric motor drive. Although a description has been given of an example where a motor compressor is used as the compressor, a variable displacement compressor capable of controlling the refrigerant discharging capacity by use of the rotation of the engine may also be used. Further, the control valve according to the preferred embodiments is applicable to not only the vehicles but also any apparatuses and devices equipped with the electrically driven valve.

In the above-described sixth to ninth embodiments, a description has been given of an example where the sealing member used to seal the opening end of the back pressure chamber is provided at a partition side but the sealing member may be provided at a valve element side. More specifically, while a sealing member extending to the partition side is provided at the valve element, an engagement member protruding on the valve element side may be provided at the partition. A predetermined clearance may be provided between the sealing member and the partition during a valve opening period, so that the outflow of the refrigerant from the back pressure chamber is permitted. Also, during a valve closing period, the sealing member is hermetically sealed against the engagement member, so that the opening end of the back pressure chamber is sealed. In this case, the valve element may be outserted (inserted around) to the partition as in the sixth to ninth embodiments or the valve element may be inserted into the partition as in the fifth embodiment.

In the above-described embodiments, a description has been given of an example where the valve element is placed in the pressure chamber, which is on the same side as the actuator (solenoid), relative to the valve hole and where the back pressure chamber is formed in this pressure chamber. In a modification, the valve element may be placed in the pressure chamber, which is on the opposite side to the actuator, relative to the valve hole, and a back pressure chamber may be formed between the body and the valve element so as to achieve the same sealing structure as in the above-described embodiments. Though in the above embodiments the control valve is configured as a constantly-open electromagnetic valve where the valve element is open while the solenoid is electrically nonconducting (turned off). Instead, the control valve may be configured as a constantly-closed electromagnetic valve where the valve element is closed while the solenoid is turned off.

In the above-described tenth embodiment, a description has been given of an example where the O-ring 38 (sealing member) is provided at a valve element 22 side but it may be provided at a guide member 24 side, instead. More specifically, a recessed groove is formed in the smaller-diameter part 90 of the guide member 24, so that the O-ring is fitted on the recessed groove. And no O-ring may be provided on the outer circumferential surface of the valve element 22, so that the surface of the valve element 22 is flat. Also, the O-ring may abut against or slide along the outer circumferential surface of the valve element 22 in a valve closing position of and near the valve element 22 so that the abutting state can be released (canceled) at least when the valve element is fully open.

In the above-described embodiments, a description has been given of an example where the control valve is configured as an electrically driven valve provided with an actuator for electrically regulating the opening degree of the valve section from the outside. Instead, the control valve may be configured as a mechanical control valve whereby the valve element is opened and closed only by the pressure differences.

In the above-described embodiments, a description has been given of an example where the control valve is configured as a shutoff valve that permits or shuts off the flow of refrigerant at the downstream side of a valve section of the expansion valve. Instead, the arrangement may be such that the flow of refrigerant is permitted or shut off at an upstream side of the valve section of the expansion valve. Also, the control valve according to the preferred embodiments may be configured as a stand-alone independent shutoff valve instead of being formed integrally with the expansion valve.

While the preferred embodiments of the present invention have been described using specific terms, such description is for illustrative purposes only, and it is to be understood that changes and variations may be made without departing from the spirit or scope of the appended claims.

What is claimed is:

1. A control valve comprising:
    a body having a lead-in port and a lead-out port of working fluid;
    a valve hole provided in a passage joining the lead-in port to the lead-out port;
    a partition being cylindrical and fixed inside the body that extends coaxially with the valve hole;
    a valve element having a bottomed cylindrical shape configured to open and close a valve section such that the valve element is inserted into or around the partition in a displaceable manner relative thereto and such that displacement of the valve element in a direction of axis line makes a bottom of the valve element touch and leave the valve hole;
    an actuator being electrically-driven and configured to supply a drive force in the direction of axis line to the valve element;
    an actuating rod configured to transmit the drive force in the direction of axis line by the actuator to the valve element, the actuating rod being supported by the actuator in the direction of axis line in a displaceable manner, the actuating rod being provided in such a manner as to be displaceable integrally with the valve element and a movable part of the actuator; and
    a pressure-canceling structure configured to cancel out at least part of pressure acting on the valve element by introducing a working fluid introduced into a back pressure chamber via a leak passage, the pressure-canceling structure including the back pressure chamber, surrounded by the valve element and the partition, and the leak passage communicating between the valve hole and the back pressure chamber,
    wherein a minimum radial clearance, between the valve element and the partition in an overlapped portion, at the time when the valve section is fully open is larger than that at the time when the valve section is closed, and an outflow of the working fluid in the back pressure chamber, at the time when the valve section is fully open, through a gap in the overlapped portion is permitted, the overlapped portion being formed such that the partition and the valve element overlap with each other by inserting the valve element into or around the partition;
    a sealing member having flexibility provided on the partition; and
    an engagement member provided on the valve element such that the sealing member is touchable thereon and detachable therefrom and wherein the sealing member is installed such that the sealing member protrudes radially from the partition toward the engagement member carried by the valve element, the valve element being biased by a spring to a valve opening direction.

2. A control valve according to claim 1,
    wherein, when the valve section is fully open, displacing the valve element toward one direction side of the direction of axis line separates the sealing member away from the engagement member and opens the gap in the overlapped portion, thereby allowing the outflow of the working fluid from the back pressure chamber, and
    wherein, when the valve section is closed, displacing the valve element toward the other direction side of the direction of axis line attaches the sealing member firmly to the engagement member so as to close the gap in the overlapped portion, thereby reducing the minimum radial clearance to zero and shutting the outflow thereof from the back pressure chamber.

3. A control valve according to claim 2,
    wherein the engagement member is provided such that engagement member protrudes radially from the other one of the partition and the valve element toward one of the partition and the valve element.

4. A control valve according to claim 3, wherein the sealing member is formed into a thin film and touches and leaves the engagement member on one side surface of the sealing member in the direction of axis line.

* * * * *